(12) United States Patent
Woodchick et al.

(10) Patent No.: US 12,448,578 B2
(45) Date of Patent: *Oct. 21, 2025

(54) LOW SULFUR FUEL OIL BLENDS FOR PARAFFINIC RESID STABILITY AND ASSOCIATED METHODS

(71) Applicant: MARATHON PETROLEUM COMPANY LP, Findlay, OH (US)

(72) Inventors: Matthew T. Woodchick, Findlay, OH (US); V. Elijah Mullins, Findlay, OH (US); Peg Broughton, Findlay, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/405,061

(22) Filed: Jan. 5, 2024

(65) Prior Publication Data

US 2024/0182803 A1 Jun. 6, 2024

Related U.S. Application Data

(63) Continuation of application No. 17/832,339, filed on Jun. 3, 2022, now Pat. No. 11,920,096, which is a
(Continued)

(51) Int. Cl.
*C10L 1/04* (2006.01)
*C10G 11/18* (2006.01)
(Continued)

(52) U.S. Cl.
CPC ............. *C10L 1/04* (2013.01); *C10G 11/18* (2013.01); *C10G 69/04* (2013.01); *C10L 1/06* (2013.01);
(Continued)

(58) Field of Classification Search
CPC .............. C10G 11/18; C10G 2300/107; C10G 2300/1077; C10G 2300/202;
(Continued)

(56) References Cited

U.S. PATENT DOCUMENTS 981,434 A 1/1911 Lander
1,526,301 A 2/1925 Stevens
(Continued)

FOREIGN PATENT DOCUMENTS

AT 11772 U1 4/2011
BR PI0701518 11/2008
(Continued)

OTHER PUBLICATIONS

Platvoet et al., Process Burners 101, American Institute of Chemical Engineers, Aug. 2013.
(Continued)

*Primary Examiner* — Ellen M McAvoy
*Assistant Examiner* — Chantel Graham
(74) *Attorney, Agent, or Firm* — Ray Quinney & Nebeker; Daniel J. Bezdjian

(57) ABSTRACT

Low sulfur fuel oil blend compositions and methods of making such blend compositions to increase the stability and compatibility of LSFO blends having paraffinic resids that are blended with distillates and/or cracked stocks of higher asphaltenes and/or aromatics content. In one or more embodiments, distillates and/or cracked stocks that incrementally reduce the initial aromaticity of the distillate or cracked stock with the highest aromaticity are sequentially blended prior to resid addition. Such incremental reduction and sequential blending have been found to provide a resulting low sulfur fuel oil blend that is both compatible and stable.

27 Claims, 6 Drawing Sheets

Related U.S. Application Data continuation of application No. 17/249,079, filed on Feb. 19, 2021, now Pat. No. 11,352,577.

(60) Provisional application No. 63/199,188, filed on Dec. 11, 2020, provisional application No. 62/978,798, filed on Feb. 19, 2020.

(51) Int. Cl.

| | | |
|---|---|---|
| *C10G 69/04* | (2006.01) | |
| *C10L 1/06* | (2006.01) | |
| *C10L 1/08* | (2006.01) | |
| *C10L 10/00* | (2006.01) | |

(52) U.S. Cl.
CPC ............... *C10L 1/08* (2013.01); *C10L 10/00* (2013.01); *C10G 2300/107* (2013.01); *C10G 2300/1077* (2013.01); *C10G 2300/202* (2013.01); *C10G 2300/205* (2013.01); *C10G 2300/206* (2013.01); *C10G 2300/207* (2013.01); *C10G 2300/302* (2013.01); *C10G 2300/304* (2013.01); *C10G 2300/308* (2013.01); *C10G 2400/04* (2013.01); *C10L 2200/0263* (2013.01); *C10L 2200/0438* (2013.01); *C10L 2200/0446* (2013.01); *C10L 2200/0461* (2013.01); *C10L 2230/14* (2013.01); *C10L 2270/026* (2013.01); *C10L 2290/24* (2013.01); *C10L 2290/46* (2013.01); *C10L 2290/543* (2013.01); *C10L 2290/547* (2013.01)

(58) Field of Classification Search
CPC ........ C10G 2300/205; C10G 2300/206; C10G 2300/207; C10G 2300/302; C10G 2300/304; C10G 2300/308; C10G 2400/04; C10G 69/04; C10L 1/04; C10L 1/06; C10L 1/08; C10L 10/00; C10L 2200/0263; C10L 2200/0438; C10L 2200/0446; C10L 2200/0461; C10L 2230/14; C10L 2270/026; C10L 2290/24; C10L 2290/46; C10L 2290/543; C10L 2290/547

See application file for complete search history.

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,312,645 A | 1/1982 | Mavros |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,583,859 A | 4/1986 | Hall, II |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,798,463 A | 1/1989 | Koshi |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |

(56) References Cited

U.S. PATENT DOCUMENTS

| | | |
|---|---|---|
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,120,517 A | 6/1992 | Elshout |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,681,749 A | 10/1997 | Ramamoorthy |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,751,415 A | 5/1998 | Smith et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |

(56) References Cited

U.S. PATENT DOCUMENTS

| | | |
|---|---|---|
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,040,186 A | 3/2000 | Lewis |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,100,975 A | 8/2000 | Smith et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,592,448 B1 | 7/2003 | Williams |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |

(56) References Cited

U.S. PATENT DOCUMENTS

| | | |
|---|---|---|
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,784,645 B2 | 7/2014 | Iguchi et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 * | 3/2015 | Droubi .............. C10L 1/04 208/15 |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,279,748 B1 | 3/2016 | Hughes et al. |
| 9,289,715 B2 | 3/2016 | HøY-Petersen et al. |
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,453,169 B2 | 9/2016 | Stippich, Jr. et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 9,988,585 B2 | 6/2018 | Hayasaka et al. |
| 10,047,299 B2 | 8/2018 | Rubin-Pitel et al. |
| 10,048,100 B1 | 8/2018 | Workman, Jr. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |

(56) References Cited

U.S. PATENT DOCUMENTS

| | | |
|---|---|---|
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 11,975,316 B2 | 5/2024 | Zalewski |
| 12,000,720 B2 | 6/2024 | Langlois, III |
| 12,018,216 B2 | 6/2024 | Larsen et al. |
| 12,031,094 B2 | 7/2024 | Sexton et al. |
| 12,031,676 B2 | 7/2024 | Craig et al. |
| 12,037,548 B2 | 7/2024 | Larsen et al. |
| 12,163,878 B2 | 12/2024 | Bledsoe, Jr. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0216214 A1 | 9/2005 | Gorin |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169064 A1 | 8/2006 | Anschutz et al. |
| 2006/0169305 A1 | 8/2006 | Jansen et al. |
| 2006/0210456 A1 | 9/2006 | Bruggendick |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0220586 A1 | 9/2011 | Levitt |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0302738 A1 | 11/2013 | Rennie |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0251129 A1 | 9/2014 | Upadhyay |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0007720 A1 | 1/2015 | Vu |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |

(56) References Cited

U.S. PATENT DOCUMENTS

| | | |
|---|---|---|
| 2017/0115190 A1 | 4/2017 | Hall et al. |
| 2017/0128859 A1 | 5/2017 | Levitt |
| 2017/0131728 A1 | 5/2017 | Lambert et al. |
| 2017/0151526 A1 | 6/2017 | Cole |
| 2017/0183575 A1* | 6/2017 | Rubin-Pitel ............ C10G 21/14 |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0234335 A1 | 8/2017 | LeBlanc et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0094809 A1 | 4/2018 | Lochschmied |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra E Mello et al. |
| 2018/0371325 A1 | 12/2018 | Streiff et al. |
| 2019/0002772 A1 | 1/2019 | Moore et al. |
| 2019/0010405 A1* | 1/2019 | Moore ..................... B01J 23/24 |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1* | 4/2020 | Moore ................... C10G 69/04 |
| 2020/0181502 A1 | 6/2020 | Paasikallio et al. |
| 2020/0191385 A1 | 6/2020 | Carroll |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |
| 2021/0318280 A1 | 10/2021 | Ludlum |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041939 A1 | 2/2022 | Titta et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |
| 2024/0189753 A1 | 6/2024 | Esquivel |
| 2024/0294837 A1 | 9/2024 | Larsen |
| 2024/0327723 A1 | 10/2024 | Larsen |
| 2024/0337352 A1 | 10/2024 | Craig |
| 2024/0377287 A1 | 11/2024 | Markins |
| 2024/0399279 A1 | 12/2024 | Duong |

FOREIGN PATENT DOCUMENTS

| | | |
|---|---|---|
| CA | 2949201 | 11/2015 |
| CA | 2822742 | 12/2016 |
| CA | 3009808 | 7/2017 |
| CA | 2904903 | 8/2020 |
| CA | 3077045 | 9/2020 |
| CA | 2947431 | 3/2021 |
| CA | 3004712 | 6/2021 |
| CA | 2980055 | 12/2021 |
| CA | 2879783 | 1/2022 |
| CA | 2991614 | 1/2022 |
| CA | 2980069 | 11/2022 |
| CA | 3109606 | 12/2022 |
| CH | 432129 | 3/1967 |
| CN | 2128346 | 3/1993 |
| CN | 201264907 Y | 7/2009 |
| CN | 201306736 | 9/2009 |
| CN | 201940168 | 8/2011 |
| CN | 102120138 | 12/2012 |
| CN | 203453713 | 2/2014 |
| CN | 103627433 | 3/2014 |
| CN | 203629938 | 6/2014 |
| CN | 203816490 | 9/2014 |
| CN | 104353357 | 2/2015 |
| CN | 204170623 | 2/2015 |
| CN | 103331093 | 4/2015 |
| CN | 204253221 | 4/2015 |

(56) References Cited

FOREIGN PATENT DOCUMENTS

| | | |
|---|---|---|
| CN | 204265565 | 4/2015 |
| CN | 105148728 | 12/2015 |
| CN | 204824775 | 12/2015 |
| CN | 103933845 | 1/2016 |
| CN | 105289241 | 2/2016 |
| CN | 105536486 | 5/2016 |
| CN | 105804900 | 7/2016 |
| CN | 103573430 | 8/2016 |
| CN | 205655095 | 10/2016 |
| CN | 104326604 | 11/2016 |
| CN | 104358627 | 11/2016 |
| CN | 106237802 | 12/2016 |
| CN | 205779365 | 12/2016 |
| CN | 106407648 | 2/2017 |
| CN | 105778987 | 8/2017 |
| CN | 207179722 | 4/2018 |
| CN | 207395575 | 5/2018 |
| CN | 108179022 | 6/2018 |
| CN | 108704478 | 10/2018 |
| CN | 109126458 | 1/2019 |
| CN | 109423345 | 3/2019 |
| CN | 109499365 | 3/2019 |
| CN | 109705939 | 5/2019 |
| CN | 109722303 | 5/2019 |
| CN | 110129103 | 8/2019 |
| CN | 110229686 | 9/2019 |
| CN | 209451617 | 10/2019 |
| CN | 110987862 | 4/2020 |
| CN | 111336612 A | 6/2020 |
| CN | 213762571 U | 7/2021 |
| CN | 213824075 U | 7/2021 |
| CN | 215263512 U | 12/2021 |
| CN | 215288592 | 12/2021 |
| CN | 113963818 | 1/2022 |
| CN | 114001278 | 2/2022 |
| CN | 217431673 | 9/2022 |
| CN | 218565442 | 3/2023 |
| DE | 10179 | 6/1912 |
| DE | 3721725 | 1/1989 |
| DE | 19619722 | 11/1997 |
| DE | 102010017563 | 12/2011 |
| DE | 102014009231 A1 | 1/2016 |
| EP | 0142352 | 5/1985 |
| EP | 0527000 | 2/1993 |
| EP | 0783910 A1 | 7/1997 |
| EP | 0949318 | 10/1999 |
| EP | 0783910 B1 | 12/2000 |
| EP | 0801299 | 3/2004 |
| EP | 1413712 | 4/2004 |
| EP | 1600491 | 11/2005 |
| EP | 1870153 | 12/2007 |
| EP | 2047905 | 4/2009 |
| EP | 2955345 | 12/2015 |
| EP | 3130773 | 2/2017 |
| EP | 3139009 | 3/2017 |
| EP | 3239483 | 11/2017 |
| EP | 3085910 | 8/2018 |
| EP | 3355056 | 8/2018 |
| EP | 2998529 | 2/2019 |
| EP | 3441442 | 2/2019 |
| EP | 3569988 | 11/2019 |
| EP | 3878926 | 9/2021 |
| FR | 2357630 | 2/1978 |
| FR | 3004722 | 3/2016 |
| FR | 3027909 | 5/2016 |
| FR | 3067036 | 12/2018 |
| FR | 3067037 | 12/2018 |
| FR | 3072684 | 4/2019 |
| FR | 3075808 | 6/2019 |
| GB | 775273 | 5/1957 |
| GB | 933618 | 8/1963 |
| GB | 1207719 | 10/1970 |
| GB | 2144526 | 3/1985 |
| GB | 2516441 | 1/2015 |
| IN | 202111016535 | 7/2021 |
| JP | 59220609 | 12/1984 |
| JP | 2003129067 | 5/2003 |
| JP | 2005147478 A | 6/2005 |
| JP | 3160405 | 6/2010 |
| JP | 2015059220 | 3/2015 |
| JP | 2019014275 | 1/2019 |
| KR | 101751923 | 7/2017 |
| KR | 101823897 | 3/2018 |
| KR | 20180095303 | 8/2018 |
| KR | 20190004474 | 1/2019 |
| KR | 20190004475 | 1/2019 |
| RU | 2673558 | 11/2018 |
| RU | 2700705 | 9/2019 |
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023020797 | 2/2023 |
| WO | 2023038579 | 3/2023 |
| WO | 2023137304 | 7/2023 |
| WO | 2023164683 | 8/2023 |
| WO | 2023242308 | 12/2023 |

OTHER PUBLICATIONS

Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems LTD., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.

(56) References Cited

OTHER PUBLICATIONS

ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.

Bueno, Alexis et al., Characterization of Catalytic Reforming Streams by NIR Spectroscopy, Energy & Fuels 2009, 23, 3172-3177, Apr. 29, 2009.

Caricato, Enrico et al., Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.

Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.

Rodriguez, Elena et al., Coke deposition and product distribution in the co-cracking of waste polyolefin derived streams and vacuum gas oil under FCC unit conditions, Fuel Processing Technology 192 (2019), 130-139.

Passamonti, Francisco J. et al., Recycling of waste plastics into fuels, PDPE conversion in FCC, Applied Catalysis B: Environmental 125 (2012), 499-506.

De Rezende Pinho, Andrea et al., Fast pyrolysis oil from pinewood chips co-processing with vacuum gas oil in an FCC unit for second generation fuel production, Fuel 188 (2017), 462-473.

Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.

Hanson et al., An atmospheric crude tower revamp, Digital Refining, Article, Jul. 2005.

Lopiccolo, Philip, Coke trap reduces FCC slurry exchanger fouling for Texas refiner, Oil & Gas Journal, Sep. 8, 2003.

Martino, Germain, Catalytic Reforming, Petroleum Refining Conversion Processes, vol. 3, Chapter 4, pp. 101-168, 2001.

Baukal et al., Natural-Draft Burners, Industrial Burners Handbook, CRC Press 2003.

Spekuljak et al., Fluid Distributors for Structured Packing Colums, AICHE, Nov. 1998.

Hemler et al., UOP Fluid Catalytic Cracking Process, Handbook of Petroleum Refining Processes, 3rd ed., McGraw Hill, 2004.

United States Department of Agriculture, NIR helps Turn Vegetable Oil into High-Quality Biofuel, Agricultural Research Service, Jun. 15, 1999.

NPRA, 2006 Cat Cracker Seminar Transcript, National Petrochemical & Refiners Association, Aug. 1-2, 2006.

Niccum, Phillip K. et al. KBR, CatCracking.com, More Production—Less Risk!, Twenty Questions: Identify Probably Cuase of High FCC Catalyst Loss, May 3-6, 2011.

NPRA, Cat-10-105 Troubleshooting FCC Catalyst Losses, National Petrochemical & Refiners Association, Aug. 24-25, 2010.

Fraser, Stuart, Distillation in Refining, Distillation Operation and Applications (2014), pp. 155-190 (Year: 2014).

Yasin et al., Quality and chemistry of crude oils, Journal of Petroleum Technology and Alternative Fuels, vol. 4(3), pp. 53-63, Mar. 2013.

Penn State, Cut Points, https://www.e-education.psu.edu/fsc432/content/cut-points, 2018.

The American Petroleum Institute, Petroleum HPV Testing Group, Heavy Fuel Oils Category Analysis and Hazard Characterization, Dec. 7, 2012.

Increase Gasoline Octane and Light Olefin Yeilds with ZSM-5, vol. 5, Issue 5, http://www.refiningonline.com/engelhardkb/crep/TCR4_35.htm.

Fluid Catalytic Cracking and Light Olefins Production, Hydrocarbon Publishing Company, 2011, http://www.hydrocarbonpublishing.com/store10/product.php?productid+b21104.

Zhang et al., Multifunctional two-stage riser fluid catalytic cracking process, Springer Applied Petrocchemical Research, Sep. 3, 2014.

Reid, William, Recent trends in fluid catalytic cracking patents, part V: reactor section, Dilworth IP, Sep. 3, 2014.

Akah et al., Maximizing propylene production via FCC technology, SpringerLink, Mar. 22, 2015.

Vogt et al., Fluid Catalytic Cracking: Recent Developments on the Grand Old Lady of Zeolite Catalysis, Royal Society of Chemistry, Sep. 18, 2015.

Zhou et al., Study on the Integration of Flue Gas Waste He Desulfuization and Dust Removal in Civilian Coalfired Heating Furnance, 2020 IOP Conf. Ser.: Earth Environ. Sci. 603 012018.

Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.

International Standard, ISO 8217, Petroleum products—Fuels (class F)—Specifications of marine fuels, Sixth Edition, 2017.

International Standard, ISO 10307-1, Petroleum products—Total sediment in residual fuel oils-, Part 1: Determination by hot filtration, Second Edition, 2009.

International Standard, ISO 10307-2, Petroleum products—Total sediment in residual fuel oils-, Part 2: Determination using standard procedures for aging, Second Edition, 2009.

Ebner et al., Deactivatin and durability of the catalyst for Hotspot™ natural gas processing, OSTI, 2000, https://www.osti/gov/etdeweb/servlets/purl/20064378, (Year: 2000).

Morozov et al., Best Practices When Operating a Unit for Removing Hydrogen Sulfide from Residual Fuel Oil, Chemistry and Technology of Fuels and Oils, vol. 57, No. 4, Sep. 2001.

Calbry-Muzyka et al., Deep removal of sulfur and trace organic compounds from biogas to protect a catalytic methananation reactor, Chemical Engineering Joural 360, pp. 577-590, 2019.

Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.

Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.

Meng et al., In bed and downstream hot gas desulphurization during solid fuel gasification: A review, Fuel Processing Technology 91, pp. 964-981, 2010.

Okonkwo et al., Role of Amine Structure on Hydrogen Sulfide Capture from Dilute Gas Streams Using Solid Adsorbents, Energy Fuels, 32, pp. 6926-6933, 2018.

Okonkwo et al., Selective removal of hydrogen sulfide from simulated biogas streams using sterically hindered amine adsorbents, Chemical Engineering Journal 379, pp. 122-349, 2020.

Bollas et al., "Modeling Small-Diameter FCC Riser Reactors. A Hydrodynamic and Kinetic Approach", Industrial and Engineering Chemistry Research, 41(22), 5410-5419, 2002.

Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.

Lloyd's Register, Using technology to trace the carbon intensity of sustainable marine fuels, Feb. 15, 2023.

"Development of Model Equations for Predicting Gasoline Blending Properties", Odula et al., American Journal of Chemical Engineering, vol. 3, No. 2-1, 2015, pp. 9-17.

Lerh et al., Feature: IMO 2020 draws more participants into Singapore's bunkering pool., S&P Global Platts, www.spglobal.com, Sep. 3, 2019.

Cremer et al., Model Based Assessment of the Novel Use of Sour Water Stripper Vapor for NOx Control in CO Boilers, Industrial Combustion Symposium, American Flame Research Committee 2021, Nov. 19, 2021.

Frederick et al., Alternative Technology for Sour Water Stripping, University of Pennsylvania, Penn Libraries, Scholarly Commons, Apr. 20, 2018.

Da Vinci Laboratory Solutions B. V., DVLS Liquefied Gas Injector, Sampling and analysis of liquefied gases, https://www.davinci-ls.com/en/products/dvls-products/dvls-liquefied-gas-injector.

(56) References Cited

OTHER PUBLICATIONS

Wasson ECE Instrumentation, LPG Pressurization Station, https://wasson-ece.com/products/small-devices/lpg-pressurization-station.

Mechatest B. V., Gas & Liquefied Gas Sampling Systems, https://www.mechatest.com/products/gas-sampling-system/.

La Rivista dei Combustibili, The Fuel Magazine, vol. 66, File 2, 2012.

Zulkefi et al., Overview of H2S Removal Technologies from Biogas Production, International Journal of Applied Engineering Research ISSN 0973-4562, vol. 11, No. 20, pp. 10060-10066, © Research India Publications, 2016.

Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.

Swagelok, Grab Sampling Systems Application Guide, 53 pages.

Frank et al., "Fuel Tank and Charcoal Canister Fire Hazards during EVAP System Leak Testing", SAE International, 2007 World Congress, Detroit, Michigan, Apr. 16-19, 2007, 11 pages.

Doolin et al., "Catalyst Regeneration and Continuous Reforming Issues", Catalytic Naptha Reforming, 2004.

Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344. (Year: 2011).

\* cited by examiner

LOW SULFUR FUEL OIL BLENDS FOR PARAFFINIC RESID STABILITY AND ASSOCIATED METHODS

CROSS-REFERENCE TO RELATED APPLICATIONS

The present application is a continuation of U.S. Non-Provisional application Ser. No. 17/832,339, filed Jun. 3, 2022, titled "Low Sulfur Fuel Oil Blends for Paraffinic Resid Stability and Associated Methods," which is a continuation of U.S. Non-Provisional application Ser. No. 17/249,079, filed Feb. 19, 2021, titled "Low Sulfur Fuel Oil Blends for Paraffinic Resid Stability and Associated Methods," now U.S. Pat. No. 11,352,577, issued Jun. 7, 2022, which claims priority to and the benefit of U.S. Provisional Patent Application No. 62/978,798, filed Feb. 19, 2020, titled "Low Sulfur Fuel Oil Blending for Stability Enhancement and Associated Methods," and U.S. Provisional Patent Application No. 63/199,188, filed Dec. 11, 2020, titled "Low Sulfur Fuel Oil Blending for Paraffinic Resid Stability and Associated Methods," the disclosures of which are incorporated herein by reference in their entirety.

FIELD OF THE DISCLOSURE

Embodiments herein generally relate to fuel oil compositions. More specifically, one or more embodiments relate to low sulfur marine bunker fuel oil compositions, and methods of blending such compositions.

BACKGROUND

The International Marine Organization (IMO) operates as an agency of the United Nations (originally formed in 1948 as the Inter-Governmental Maritime Consultative Organization) and sets global standards for the safety and security of international shipping as well as the prevention of environmental pollution by such shipping. The promotion of sustainable shipping and maritime development has been a major goal of IMO in recent years. To that end, the Marine Environment Protection Committee, the working arm of IMO charged with addressing environmental issues, has adopted more stringent worldwide marine sulfur standards for all maritime transport. These increased standards took effect in 2020 and are set forth in ISO 8217 Petroleum Products—Fuels (Class F)—Specifications of Marine Fuels, published by the International Organization for Standardization ("IMO 2020"). The United States has been a member of IMO since 1950 and has since that time enforced the maritime compliance of all IMO regulations Maritime transportation operates as a critical part of the global economy, responsible for more than 80% of global trade by volume. At least 10% of such trade originates from U.S. ports. This global shipping volume comes with a large global oil demand, which has been estimated by the International Energy Agency to be approximately 4.3 million barrels per day, which is equivalent to about 4% of the global energy demand. The IMO 2020 standards implement a requirement to reduce sulfur in traditional marine fuel—high sulfur fuel oils—to be less than 0.5% by weight (less than 5000 wppm). Thus, the effect of the IMO 2020 standards significantly impacts scope and volume.

Compliance with the IMO 2020 regulations resides with vessel owners and operators, which employ marine fuels—otherwise known as bunker fuels—for powering maritime vessels globally. Generally, there exists three options for such vessel owners and operators to comply with the IMO 2020 regulations: First, they can use a marine bunker fuel oil having less than 0.5% sulfur by weight. Second, they can continue to use high sulfur marine fuel oils and install a scrubber on the maritime vessel to remove sulfur from the combustion gases or emissions. Or, thirdly, they can switch to alternative fuels, such as natural gas, with low sulfur content that alternatively meet the low sulfur requirement.

U.S refineries account for approximately 20% of global refining capability. Therefore, the need to produce low sulfur fuel oils for maritime use with sulfur contents less than 0.5% by weight has been and will continue to be a challenge to U.S refining operations. The dilution of high sulfur fuel oils with low sulfur distillates to meet the low sulfur, viscosity, and the other fuel specifications of IMO 2020, has been a strategy of many refiners. Asphaltene precipitation, however, continues to be problematic.

In an attempt to prevent asphaltene precipitation upon mixing high sulfur fuel oils with low sulfur distillates, refiners have increasingly turned to proprietary additives to facilitate maintaining asphaltenes in solution. Such stop gap measures are expensive and tenuous at best when solving the larger problem of fuel compatibility and/or stability. What is needed therefore is a fuel oil blend and method of blending that meets the specifications of IMO 2020 (see ISO 8217), including its low sulfur requirement, while achieving initial compatibility and longer term stability.

SUMMARY

In the wake of IMO 2020, the enhancement of a residual hydrocarbon fraction or residuum (resid) through the utilization of low sulfur distillates and cracked stocks may be used to produce low sulfur fuel oil (LSFO), otherwise known as low sulfur marine bunker fuel oil. Enhancement of the residual base stock permits otherwise non-compliant hydrocarbon streams to become economically viable blends for sale e.g., as a product in the LSFO market. Enhancement of resid base stocks with low sulfur distillate, decant oil, cracked hydrocarbon fractions, or a combination thereof also facilitates the creation of marine and other fuels which are economically advantageous, because they often use greater amounts of lower cost, heavier blend components in the final blend. However, the blending of residuum with distillates and other refined products can cause initial compatibility and/or longer term stability problems, such as asphaltene precipitation. Herein, Applicant discloses one or more embodiments of low sulfur fuel oil blend compositions and methods of making such blend compositions to increase the stability and compatibility of LSFO blends having paraffinic resids that are blended with distillates and/or cracked stocks of higher asphaltene and aromatic content.

In one or more embodiments, a method of making and distributing a low sulfur marine bunker fuel oil composition that has an increased initial compatibility and longer term stability is disclosed. A resid, which may be one or more of an atmospheric tower bottoms resid or a vacuum tower bottoms resid, is selected that has an aromatic content of less than about 50% by weight. A first slurry oil is selected that has an aromatic content of greater than about 70% by weight. A second slurry oil is also selected that has an aromatic content of less than about 70% by weight. The first slurry oil and the second slurry oil are blended together in a tank to define a slurry oil mixture having a percentage of aromatics that is less than the aromatic content of the first slurry oil. The resid is then blended into the slurry oil mixture in the tank to define a low sulfur marine bunker fuel oil. In one or more embodiments, the low sulfur marine bunker fuel oil has a sulfur content of less than about 0.5% by weight and an aged sediment of less than about 0.1% by weight. The low sulfur marine bunker fuel oil is then pumped from the tank through a pipeline. In one or more embodiments, the resid may also have a paraffinic content of at least 35% by weight. In at least one embodiment, the method includes acquiring an additional slurry oil have an aromatic content by weight percent less than the aromatic content by weight percent of previously added slurry oil, blending the additional slurry oil into the slurry oil mixture in the tank, and maintaining the percentage of aromatics in the slurry oil mixture less than the aromatic content of the first slurry oil prior to blending the resid therewith.

In one or more embodiments, a method of making and distributing a low sulfur marine bunker fuel oil composition that has an increased initial compatibility and longer term stability is disclosed. A resid, which may be one or more of an atmospheric tower bottoms resid or a vacuum tower bottoms resid, is selected that has a paraffinic content of at least 35% by weight. A first slurry oil is selected that has an aromatic content of greater than about 65% by weight. A second slurry oil is also selected that has an aromatic content that is between about 1% and about 20% lower than the aromatic content of the first slurry. The first slurry oil and the second slurry oil are added to a mixing tank. The first slurry oil and the second slurry oil are blended together to define a slurry oil mixture that has a percentage of aromatics that is less than the aromatic content of the first slurry oil. The resid is then added to the tank and blended with the slurry oil mixture to define a low sulfur marine bunker fuel oil. In one or more embodiments, the low sulfur marine bunker fuel oil has a sulfur content less than about 0.5% by weight and an aged sediment of less than about 0.1% by weight. The low sulfur marine bunker fuel oil is then pumped from the tank through a pipeline. In one or more embodiments, the resid may also have an aromatic content of less than about 50% by weight.

In one or more embodiments, a low sulfur marine bunker fuel oil composition that has an increased initial compatibility and longer term stability is disclosed. The composition includes a first slurry oil having an aromatic content of greater than about 70% by weight, a second slurry oil having an aromatic content of less than about 70% by weight. The second slurry oil and the first slurry oil are blended into a slurry oil mixture, and a resid is added that has a paraffinic content of at least 35% by weight and an aromatic content of less than about 50% by weight. The resid is added to the slurry oil mixture to define a low sulfur marine bunker fuel oil that has a sulfur content less than about 0.5% by weight and an aged sediment of less than about 0.1% by weight.

In one or more embodiments, a low sulfur marine bunker fuel oil composition that has an increased initial compatibility and longer term stability is disclosed. The composition includes a plurality of slurry oils with at least one of the plurality of slurry oils having an aromatic content of greater than about 70% by weight and at least another of the plurality of the slurry oils having an aromatic content of less than about 70% by weight. The one of the plurality of slurry oils and the another of the plurality of slurry oils being blended into a slurry oil mixture, and a resid is added having a paraffinic content of at least 35% by weight and an aromatic content that is at most about 20% by weight lower than the aromatic content of the another of the plurality of slurry oils. The resid is added to the slurry oil mixture to define a low sulfur marine bunker fuel oil that has a sulfur content less than about 0.5% by weight and an aged sediment of less than about 0.1% by weight.

In one or more embodiments, a low sulfur marine bunker fuel oil composition that has an increased initial compatibility and longer term stability is disclosed. The composition includes a plurality of slurry oils with each of the plurality of slurry oils having an aromatic content that is within about 20% by weight of the aromatic content of at least one other of the plurality of slurry oils. The plurality of slurry oils is blended into a slurry oil mixture, and a resid is added having a paraffinic content of at least 35% by weight and an aromatic content that is at most about 20% by weight lower than the aromatic content of at least one of the plurality of slurry oils. The resid is added to the slurry oil mixture to define a low sulfur marine bunker fuel oil that has a sulfur content less than about 0.5% by weight and an aged sediment of less than about 0.1% by weight.

In one or more embodiments, a controller to operate making and distributing of a low sulfur marine bunker fuel oil composition that has an increased initial compatibility and longer term stability is disclosed. The controller may include one or more processors and memory to store instructions. The one or more processors may execute the instructions stored in the memory. The instructions may, when executed via the one or more processors, select a resid that has a paraffinic content of at least 35% by weight and/or an aromatic content of less than about 50% by weight. The instructions may, when executed via the one or more processors, select a first slurry oil having an aromatic content of greater than about 65% or 70% aromatic content. The instructions may, when executed via the one or more processors, select a second slurry oil having an aromatic content less than the aromatic content of the second slurry oil. In response to a selection of the first slurry oil and the second slurry oil, the instructions, when executed by the one or more processors, may initiate transportation of the first slurry oil and the second slurry oil to a blend tank. Upon reception of the first slurry oil and the second slurry oil by the blend tank, the instructions may, when executed via the one or more processors, initiate blending of the first slurry oil and the second slurry oil for a length of time.

After the length of time, the controller may determine whether a correct percentage of aromatics exists in the mixture or at least one component of the mixture is at the correct aromatic content relative to the aromatic content of the resid. In response to a determination that the mixture does not have a correct percentage of aromatics or at least one component of the mixture is not at the correct aromatic content, the instructions may, when executed by the one or more processors, select another slurry oil at another aromatic content. The instructions may, when executed by the one or more processors, initiate transportation of the another slurry oil to the blend tank. Upon reception of the another slurry oil in the blend, the instructions may, when executed by the one or more processors, initiate blending for a length of time. In response to a determination that the mixture is at the correct percentage of aromatics or at least one component of the mixture is at the correct aromatic content, the instructions may, when executed by the one or more processors, initiate transport of the resid to the blend tank. The instructions may, when executed by one or more processors, initiate the blending of the resid with the mixture in the blend tank. After another length of time, the instructions may, when executed by the one or more processors, initiate the pumping of the mixture from the blend tank through a pipeline.

In another embodiment, the controller may be in signal communication with a sensor disposed in or on the blend tank. The sensor may determine or measure characteristics of the mixture. The characteristics may include aromatic or paraffinic content. The controller may be in signal communication with one or more slurry oil valves to control an amount of one or more slurry oils to be transported to the blend tank. The controller may be in signal communication with one or more resid valves to control an amount of one or more resids to be transported to the blend tank. The controller may be in signal communication with one or more distillate valves to control an amount of one or more distillates to be transported to the blend tank. The controller may be in signal communication with a slurry pump, resid pump, and distillate pump to control when the slurry pump, resid pump, and distillate pump is active. The controller may be in signal communication with a user interface. Varying amounts of one or more or two or more slurry oils, one or more resids, and/or one or more distillates may be input at the user interface to be added at certain periods of time for blending in the blend tank.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1:
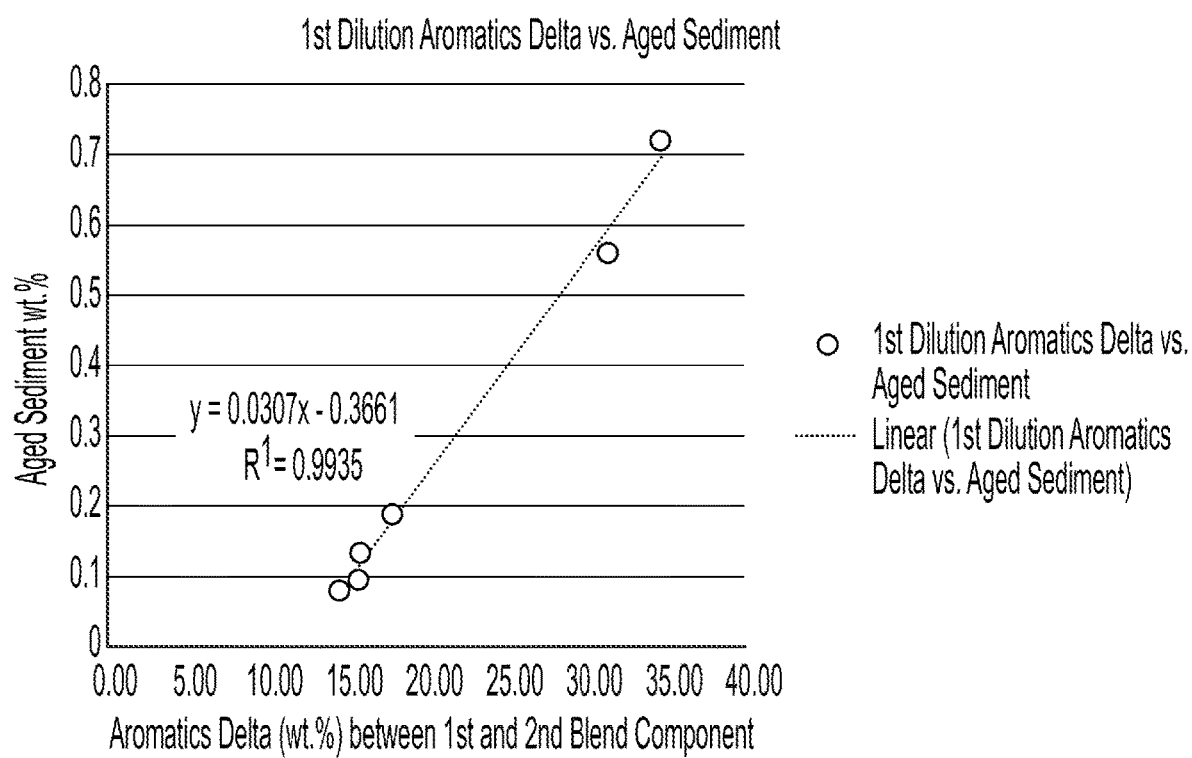
FIG. 1 is a plot of aromatics delta in weight percent between the first and second blend component versus aged sediment weight percent, according to one or more embodiments disclosed herein.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the embodiments of the systems and methods disclosed herein and are therefore not to be considered limiting of the scope of the systems and methods disclosed herein as it may include other effective embodiments as well.

With the implementation of lower sulfur specifications for marine fuel oil under IMO 2020, refiners have explored blends of higher sulfur refinery products, such as resid, with lower sulfur cutter stocks, e.g., distillates and cracked stocks, in order to meet the low sulfur requirements and other fuel specifications. However, the blend must have initial compatibility in order to prevent asphaltenes suspended in the heavy blend fraction from precipitating out of solution upon blending. Moreover, the blend must also have longer term stability, such that the asphaltenes present in the heavy blend fraction remain in solution over time during sale, distribution, and other outputting, e.g., during storage and/or transport.

Certain resids, however, depending on the crude oil feedstock and/or the refinery processing, may be low in sulfur, e.g., less than 1.25 wt %, less than 1.0 wt %, less than 0.75 wt %, or even less than 0.5 wt %, such that a higher sulfur distillate or cracked stock may be blended therewith to achieve a low sulfur fuel oil (LSFO), e.g., having less than 0.5 wt % sulfur, for use in marine applications. If such resids also have a lower density (i.e., a higher API gravity), then the blending of certain distillates and/or cracked stock can heavy up or increase the density of the resulting LSFO. Because LSFO is generally sold on the basis of weight, LSFO having denser hydrocarbon components provides greater economic return when sold. Thus, refiners may increase the density of otherwise low sulfur resids by adding higher density distillates and cracked stocks to the resulting LSFO in order to be able to sell the heaviest LSFO that meets the IMO 2020 specifications.

Applicant has recognized, however, that compatibility and/or stability of the LSFO may be a concern if low sulfur resids or base stocks are blended with heavier weight/greater density distillates and/or cracked stocks. This is especially the case if the resids or base stocks are higher in paraffin content, e.g., greater than 25%, greater than 30%, greater than 35%, or even greater than 40%, and the distillates and/or cracked stocks are higher in asphaltene content, i.e., as indicated by the heptane insolubles being greater than those of the resids. Such distillates and/or cracked stocks may have a higher asphaltene content than even the asphaltene contents of the resids. Thus, the Applicant has recognized that incompatibility and/or stability issues may cause the asphaltenes in the distillates and/or cracked stocks to precipitate out upon blending with the paraffinic, and in some cases low asphaltenic, resids.

Nonetheless, the Applicant has further discovered that such incompatibility and/or stability issues may be reduced and/or mitigated if the aromatic content/percentage of the components to be blended (e.g., resid, distillate and cracked stock) are initially considered. Specifically, the Applicant has found that such incompatibility and/or stability may be reduced and/or mitigated by incorporating distillates/hydrocarbon fractions (e.g., certain VGO, diesel fuel, etc.) and/or cracked stocks (e.g., slurry/decant oil, cycle oil, etc.) that incrementally reduce the initial aromaticity of the distillate/hydrocarbon fractions or cracked stock with the highest aromaticity prior to any resid addition. In other words, prior to any resid addition, the component (i.e., distillate or cracked stock) with the highest aromaticity is blended with another component (i.e., another distillate or cracked stock) having a lower aromaticity to create a two-component blend having an aromaticity that is less than the aromaticity of the component with the highest aromaticity. Additional components (i.e., distillate or cracked stock) having incrementally lower aromaticity may be blended with the other blended components to further reduce the aromaticity of the resulting blend. In this way, the Applicant has found that distillates and/or cracked stocks having aromatic contents between the component with highest aromatic content and the resid (or other component having the lowest aromatic content) effectively provide a bridge therebetween to stabilize and/or promote compatibility between the high aromatic distillates and/or cracked stocks and the high paraffinic resid or base stock.

Based on these discoveries by Applicant, several hand blends were made using various resid, distillate and cracked stock components to further identify those blends and methods of making such blends that provide the desired blend compatibility and stability. Table I provides the SARA, density, and other characteristics of two vacuum tower bottoms resids (VTB) that were used in the several blend recipes of TABLE II.

TABLE I

|  | VTB #1 | VTB #2 |
| --- | --- | --- |
| Saturates wt % | 35.23 | 39.42 |
| Aromatics wt % | 47.27 | 43.97 |
| Resins wt % | 14.05 | 14.62 |
| Asphaltenes wt % | 3.44 | 1.97 |
| Density (g/ml) | 0.96 | 0.95 |
| Heptane Ins. wt % | 0.93 | 0.48 |
| Viscosity | 6333.94 $_{@50\ C.}$ | 45.12 $_{@135\ C.}$ |
| MCRT wt % | 10.67 | 7.31 |
| CCAI | 798 | 789 |
| CII | 0.631 | 0.706 |

As provided in TABLE I above, the two VTBs, which were produced at separate refineries, have similar characteristics. For VTB #1, the paraffin content (i.e., saturates) is about 35 wt % and the aromatic content is about 47 wt %. For VTB #2, the paraffin content (i.e., saturates) is about 39 wt % and the aromatic content is about 44 wt %. Both VTB #1 and VTB #2 have relatively low asphaltenes content at about 3.4 wt % and 2.0 wt %, respectively. The density of these resids is also relatively low. As used in this disclosure, the aromatic content is the aromaticity of the component or mixture of components and may be represented as a percentage or concentration of aromatics that may be found in the component or mixture of components.

TABLE II provides the prepared blend recipes that use one of the VTBs of TABLE I along with other slurry oils (i.e., cracked stock) and distillates (i.e., a paraffinic VGO). As is well known to those skilled in the art, decant oil, otherwise known as DCO or slurry oil, is a catalytic cracked aromatic process oil that is the heaviest cut from a fluid catalytic cracker. TABLE II also provides the aromatic content of each of the blended components. The delta or difference of the CCAI values between the first and second blended component are also listed. In preparing these hand blends, the designated first component had the highest aromatic content and the designated second component had the second highest aromatic content. Additional components, if any, were added in the specified quantities in the order of decreasing aromaticity, such that in most cases, the VTB resid and/or the VGO components were blended into the other components last or as a final step.

TABLE II

|  | Individual Aromatics wt % | CCAI | Blend #1 wt % | Blend #2 wt % | Blend #3 wt % | Blend #4 wt % | Blend #5 wt % | Blend #6 wt % |
| --- | --- | --- | --- | --- | --- | --- | --- | --- |
| Slurry Oil #1 | 78.54 | 912 | 0 | 30.49 | 31.38 | 30.72 | 30.06 | 0 |
| Slurry Oil #2 | 62.81 | 858 | 0 | 0 | 24.77 | 0 | 23.92 | 0 |
| Slurry Oil #3 | 53.91 | 883 | 0 | 0 | 0 | 0 | 0 | 0 |
| VTB #2 | 43.97 | 789 | 25.09 | 26.89 | 25.08 | 0 | 0 | 0 |
| VTB #1 | 47.27 | 798 | 0 | 0 | 0 | 25.71 | 27.91 | 25 |
| VGO | 29.51 | 766 | 74.91 | 42.62 | 18.78 | 43.56 | 18.1 | 75 |
| Aged Sediment wt % |  |  | 0.0817 | 0.719 | 0.1327 | 0.5623 | 0.09 | 0.1867 |
| Aromatics Delta wt % |  |  | 14.46 | 34.57 | 15.73 | 31.27 | 15.73 | 17.76 |
| CCAI Delta |  |  | 23 | 123 | 54 | 114 | 54 | 32 |

Looking at TABLE II, Blend #1 and Blend #5 have an aged sediment of less than 0.1 percent by weight, which is indicative of a compatible and stable blend. As is well known to those skilled in the art, the aged sediment, also known as total sediment aged, TSP, and total sediment potential, is a characteristic of the fuel oil that for marine fuel oils must be under 0.1 percent weight per the IMO 2020 requirements. Blend #3 has an aged sediment of about 0.13 weight percent, which is not much higher than 0.1%. The other blends (incorporating an oil slurry) have aged sediments well above the 0.1 percent by weight. Analyzing the data of TABLE II, the compatibility and stability of Blend #5 may result from the blending of both Slurry Oil #1 and Slurry Oil #2 prior to adding the VTB #1 and VGO. Slurry Oil #1 has an aromatic content of about 78 wt %, which is above 70 wt %, while Slurry Oil #2 has an aromatic content of about 63 wt %, which is below 70 wt %. Here, the Slurry Oil #2 provides a component to the blend that has an aromatic content that is between the higher aromatic content of the Slurry Oil #1 (aromatic content of about 78 wt %) and the to be added VTB #1 (aromatic content of about 47 wt %). In this way, the addition of the Slurry Oil #2 is believed to bridge the aromaticity concentration of the blend between higher aromatic components and lower aromatic (higher paraffinic) resids and/or distillates. With respect to Blend #5, the aromatic content delta (or the difference between the aromatic weight percentages of the two compared components) is less than 16% between Slurry Oil #1 and Slurry Oil #2 (e.g., 15.73%), less than 16% between Slurry Oil #2 and the VTB #1 (e.g., 15.54%), and less than 18% between the VTB #1 and the VGO (e.g., 17.76%).

Turning now to Blend #3 of TABLE II, the aromatic content delta is less than 16% between Slurry Oil #1 and Slurry Oil #2 (e.g., 15.73%), less than 19% between Slurry Oil #2 and VTB #2 (e.g., 18.84), less than 15% between VTB #2 and VGO (e.g., 14.46). However, the aged sediment of Blend #3 is slightly above 0.1%. Thus, the aromatic content delta between some components of Blend #3 may be too great, e.g., the aromatic content delta between Slurry Oil #2 and VTB #2, or an insufficient amount of one or more of the components relative to the other components may have been used, e.g., a greater amount of Slurry Oil #2 may be needed relative to the amount of VTB #2 used. Here, the components of Blend #3 are about equally present in the final blend (31% Slurry Oil #1, 25% Slurry Oil #2, 25% VTB #2, and 19% VGO). However, slight adjustments in percentages of one or more components relative to the others may produce an aged sediment of less than 0.1%, especially since the aromatic content deltas of all the components are below about 20%. Thus, compatibility and stability of the LSFO blend may be realized, as evidenced by an aged sediment of less than 0.1 wt %, if the aromatic content delta is no more than about 18%, no more than about 16%, no more than about 14%, no more than about 12%, no more than about 10%, no more than about 5% or no more than about 1%, or any percent thereinbetween. In other embodiments, an aromatic content delta of as much at 20% may yield a compatible and stable blend having an aged sediment of less than 0.1 wt %.

When the aromatic content delta between components of the blend is greater than about 20%, the incompatibility and instability of the resulting blend becomes more apparent. For example, in Blend #2 of TABLE II, the aromatic content delta between Slurry Oil #1 and the VTB #2 is greater than 34% (e.g., 34.57%), which results in an aged sediment of 0.719 wt % for the blend (even after VGO addition), which is well above the 0.1% specification. Similarly, Blend #4 also has a large aromatic content delta between Slurry Oil #1 and VTB #1 (e.g., 31.27%), which may cause the aged sediment to be at 0.5623 wt % for the resulting mixture. In both Blends #2 and #4, the addition of a component or components having an intermediate aromatic content may result in a stable and compatible LSFO, i.e., for the reasons described above with respect to Blend #5 (and Blend #3).

FIG. 1 illustrates a plot of aromatics delta in weight percent between the first and second blend component versus aged sediment in weight percent. The aromatics content delta between the first and second component trends well with the resulting aged sediment. Both of the residuals, VTB #1 and VTB #2, fall on the same trend line. Considering that VTB #1 and VTB #2 have similar characteristics, as previously noted, it would be expected that these two resids would so correlate. As shown in FIG. 1, the cluster of data points below about 0.2 wt % aged sediment have an aromatics delta in weight percent between the first and second component of between about 15% and about 20%. Thus, this plot suggests that an aromatics content delta between the first and second blend component that exceeds from about 16 to 18% is more likely to lead to asphaltenes precipitation. The data in TABLE II, as presented above, indicates the aromatics content delta between each blend component (including between the slurry oils and the resids) could be as high as 16%, 18% or even 20% without leading to asphaltenes precipitation. Now looking at the right hand of the plot of FIG. 1, the two data points with aromatics content deltas well above 20% have aged sediments of well above 0.1%, which is indicative of resulting blends that will precipitate asphaltenes.

TABLE III below provides a representative LSFO blend recipe for resid, distillate, and cracked stock components that may be blended in a blend tank and pumped through a pipeline. As can be understood from TABLE III in conjunction with TABLE I, TABLE VII, and TABLE VIII (each providing component properties and characteristics data), the blend recipe of LSFO #1 has first and second slurry oil components that have aromatic content deltas within 2 wt % of each other (e.g., compare Slurry Oil #1 having an aromatics content of 78.54 wt % with Slurry Oil #4 having an aromatics content of 77.14 wt %). In fact, each of the components of LSFO #1 has an aromatics content within about 16 wt % of the component with the next highest aromatics content. TABLE IV provides an analysis of the characteristics of the resulting LSFO #1, in which the slurry oil with the highest aromatics content is blended with the slurry oil with the next highest aromatics content and so on until the all of the listed components (including the resids) are fully blended. An unexpected result of the blend recipe of LSFO #1 is that no distillate (e.g., VGO) is needed or blended therewith to reduce sulfur, lower viscosity, or otherwise conform the final blend to the IMO 2020 specifications. From TABLE IV, the total sulfur content of LSFO #1 is less than 0.5 wt %, and the API gravity is less than 16. Finally, the aged sediment of LSFO #1 was below 0.1 wt %, which is indicative of a compatible and stable blend.

TABLE III

| LSFO #1 | |
|---|---|
| Component | wt % |
| Slurry Oil #1 | 19 |
| Slurry Oil #4 | 9 |
| Slurry Oil #2 | 16 |
| Slurry Oil #3 | 4 |
| VTB #1 | 20 |
| ATB #1 | 16 |
| ATB #2 | 16 |
| Total | 100 |

TABLE IV

| Method | Test | Result |
|---|---|---|
| ASTM D4052 | API Gravity @ 60° F., °API | 15.9 |
| ASTM D445 | Kinematic Viscosity at 50° C., mm$^2$/$_5$ | 96.08 |
| ASTM D4294 | Total Sulfur Content, % (m/m) | 0.474 |
| IP501 | Aluminum, mg/kg | 23 |
| | Silicon, mg/kg | 34 |
| | Aluminum + Silicon, mg/kg | 57 |
| | Sodium, mg/kg | 7 |
| | Vanadium, mg/kg | <1 |
| ASTM D4870 | Accelerated Total Sediment, % (m/m) | 0.03 |
| | Potential Total Sediment, % (m/m) | |
| ASTM D4740 | Cleanliness Rating | 2 |
| | Compatibility Rating | 2 |

TABLE V below provides another representative LSFO blend recipe for resid, distillate, and cracked stock components that may be blended in a blend tank and pumped through a pipeline. As can be understood from TABLE V in conjunction with TABLE I, TABLE VII, and TABLE VIII (each providing component properties and characteristics data), the blend recipe of LSFO #2 has first and second slurry oil components that have aromatic content deltas within 3 wt % of each other (e.g., compare Slurry Oil #5 having an aromatics content of 81.1 wt % with Slurry Oil #1 having an aromatics content of 78.54 wt %). In fact, each of the components of LSFO #2 has an aromatics content within about 15 wt % of the component with the next highest aromatics content. TABLE VI provides an analysis of the characteristics of the resulting LSFO #2, in which the component (whether slurry oil, resid, or distillate) with the highest aromatics content is blended with the slurry oil with the next highest aromatics content and so on until the all of the listed components (including the resid and distillate components) are fully blended. An unexpected result of the blend recipe of LSFO #2 is that less than about 10% of a distillate (e.g., VGO) is needed or blended therewith to reduce sulfur, lower viscosity, or otherwise conform the final blend to the IMO 2020 specifications. Based on the blend recipes of LSFO #1 and LSFO #2, the weight percent of distillate added may less than about 10%, less than about 5%, less than about 2%, or even 0%. From TABLE VI, the total sulfur content of LSFO #2 is less than 0.5 wt %, and the API gravity is less than 14. Finally, the aged sediment of LSFO #2 was below 0.1 wt %, which is indicative of a compatible and stable blend.

TABLE V

LSFO #2

| Component | wt % |
|---|---|
| Slurry Oil #1 | 11 |
| Slurry Oil #4 | 11 |
| Slurry Oil #2 | 9 |
| Slurry Oil #3 | 6 |
| Slurry Oil #5 | 6 |
| VTB #1 | 11 |
| VTB #3 | 10 |
| ATB #1 | 9 |
| ATB #2 | 9 |
| ATB #3 | 9 |
| VGO | 9 |
| Total | 100 |

TABLE VI

| Method | Test | Result |
|---|---|---|
| ASTM D4052 | API Gravity @ 60° F., °API | 13.8 |
| ASTM D445 | Kinematic Viscosity at 50° C., mm$^2$/s | 123.9 |
| ASTM D4294 | Total Sulfur Content, % (m/m) | 0.459 |
| IP501 | Aluminum, mg/kg | 23 |
|  | Silicon, mg/kg | 32 |
|  | Aluminum + Silicon, mg/kg | 55 |
|  | Sodium, mg/kg | 5 |
|  | Vanadium, mg/kg | 2 |
| ASTM D4870 | Accelerated Total Sediment, % (m/m) | 0.05 |
|  | Bath Verification | Yes |
|  | Potential Total Sediment, % (m/m) |  |
| ASTM D4740 | Cleanliness Rating | 2 |
|  | Compatibility Rating | 2 |

TABLE VII

| Component | Saturates wt % | Aromatics wt % | Resins wt % | Asphaltenes wt % | Sulfur wt % | Density @ 15 C. (g/ml) | Heptane Ins. wt % | Viscosity @ 50 C. cSt | MCRT wt % | CCAI | CII | Sat/Res |
|---|---|---|---|---|---|---|---|---|---|---|---|---|
| Slurry Oil #3 | 39.09 | 53.91 | 6.55 | 0.45 | 0.587 | 1 | 0.72 | 68.47 | 5.42 | 883 | 0.654 | 5.968 |
| Slurry Oil #2 | 31.32 | 62.81 | 5.31 | 0.56 | 0.517 | 0.99 | 0.3 | 25.40 | 2.69 | 858 | 0.468 | 5.898 |
| Slurry Oil #4 | 16.53 | 77.14 | 5.39 | 0.95 | 0.0645 | 1.05 | 1.59 | 49.79 | 6.89 | 937 | 0.212 | 3.067 |
| Slurry Oil #1 | 16.83 | 78.54 | 3.46 | 1.16 | 1.11 | 1.05 | 5.28 | 345.79 | 9.61 | 912 | 0.219 | 4.864 |
| Slurry Oil #5 | 11.3 | 81.1 | 4.7 | 2.9 | 0.185 | 1.1 | 8.7 | 581.60 | 15 | 957 | 0.166 | 2.404 |

TABLE VIII

| Component | Saturates wt % | Aromatics wt % | Resins wt % | Asphaltenes wt % | Density @ 15 C. (g/ml) | Heptane Ins. wt % | Viscosity @ 50 C. cSt | MCRT wt % | CCAI | CII | Sulfur wt % |
|---|---|---|---|---|---|---|---|---|---|---|---|
| ATB #3 | 50.19 | 46.7 | 2.21 | 0.9 | 0.92 | 0.55 | 92.28 | 1.82 | 798 | 1.045 | 0.188 |
| ATB #2 | 8.55 | 36.93 | 3.3 | 1.18 | 0.89 | 0.61 | 31.01 | 1.57 | 784 | 0.242 | 0.221 |
| ATB #1 | 66.21 | 21.46 | 5.77 | 6.56 | 0.85 | 0.73 | 45.33 | 1.94 | 738 | 2.672 | 0.262 |
| VGO | 68.68 | 29.51 | 1.81 | 0 | 0.89 |  | 115.19 | 0.28 | 766 | 2.247 | 0.245 |
| VTB #3 | 22.63 | 59.59 | 15.44 | 2.34 | 0.98 | 1.91 | 53.72 | 11.24 | 817 | 0.333 | 0.78 |

TABLE IX below provides another representative LSFO blend recipe for resid, distillate, and cracked stock components that may be blended in a blend tank and pumped through a pipeline. As can be understood from TABLE IX in conjunction with TABLE I, TABLE VII, and TABLE VIII (each providing component properties and characteristics data), the blend recipe of LSFO #3 has first and second slurry oil components that again have aromatic content deltas within 2 wt % of each other (e.g., compare Slurry Oil #1 having an aromatics content of 78.54 wt % with Slurry Oil #4 having an aromatics content of 77.14 wt %). In fact, each of the components of LSFO #3 has an aromatics content within about 15 wt % of the component with the next highest aromatics content. TABLE X provides an analysis of the characteristics of the resulting LSFO #3, in which the component (whether slurry oil, resid, or distillate) with the highest aromatics content is blended with the slurry oil with the next highest aromatics content and so on until the all of the listed components (including the resid and distillate components) are fully blended. From TABLE X, the total sulfur content of LSFO #3 is less than 0.5 wt %, and the API gravity is less than 18.5. Finally, the aged sediment of LSFO #3 was below 0.1 wt %, which is indicative of a compatible and stable blend.

TABLE IX

LSFO #3

| Component | wt % |
|---|---|
| Slurry Oil #1 | 14 |
| Slurry Oil #4 | 10 |
| Slurry Oil #2 | 9 |
| Slurry Oil #3 | 4 |
| VTB #1 | 14 |
| ATB #2 | 3 |
| ATB #3 | 15 |
| VGO | 31 |
| Total | 100 |

TABLE X

| Method | Test | Result |
|---|---|---|
| ASTM D4052 | API Gravity @ 60° F., °API | 18.4 |
| ASTM D445 | Kinematic Viscosity at 50° C., mm$^2$/$_5$ | 71.35 |
| ASTM D4294 | Total Sulfur Content, % (m/m) | 0.399 |
| ASTM D97 | Pour Point, ° C. | 0 |
|  | Pour Point, ° F. | 32 |
| ASTM D4870 | Accelerated Total Sediment, % (m/m) | 0.05 |
|  | Potential Total Sediment, % (m/m) | 0.04 |
| ASTM D7061 | Dilution Ratio | 1 to 9 |
|  | Separability Number, % | 0.3 |
| ASTM D4740 | Cleanliness Rating | 2 |
|  | Compatibility Rating | 3 |

TABLE XI below provides another representative LSFO blend recipe for resid, distillate, and cracked stock components that may be blended in a blend tank and pumped through a pipeline. As can be understood from TABLE XI in conjunction with TABLE I, TABLE VII, and TABLE VIII (each providing component properties and characteristics data), the blend recipe of LSFO #4 has a single slurry oil component that has an aromatic content delta within 7 wt % of a resid (e.g., compare Slurry Oil #3 having an aromatics content of 53.91 wt % with VTB #1 having an aromatics content of 47.27 wt %). In fact, the three components of the LSFO #4 with the highest aromatic contents (Slurry Oil #3, VTB #1, and ATB #3) are within about 8 wt % of each other. ATB #1 and ATB #3 have the greatest aromatics content delta at about 25 wt % difference. However, both ATB #1 and ATB #3 are highly paraffinic at 66.21 wt % and 50.19 wt %, respectively, which may compensate for the larger difference in aromatics content delta. TABLE XII provides an analysis of the characteristics of the resulting LSFO #4, in which the blend component with the highest aromatics content is blended with component having the next highest aromatics content and so on until the all of the listed components are fully blended. An unexpected result of the blend recipe of LSFO #4 is that no distillate (e.g., VGO) is needed or blended therewith to reduce sulfur, lower viscosity, or otherwise conform the final blend to the IMO 2020 specifications. From TABLE XII, the total sulfur content of LSFO #4 is less than 0.5 wt %, and the API gravity is less than 20.5. Finally, the aged sediment of LSFO #4 was below 0.1 wt %, which is indicative of a compatible and stable blend.

TABLE XI

LSFO #4

| Component | wt % |
|---|---|
| Slurry Oil #3 | 20 |
| VTB #1 | 37 |
| ATB #1 | 11 |
| ATB #3 | 32 |
| Total | 100 |

TABLE XII

| Method | Test | Result |
|---|---|---|
| ASTM D4052 | API Gravity @ 60° F., °API | 20.4 |
| ASTM D445 | Test Temperature, ° C. | 50 |
|  | Kinematic Viscosity at 50° C., mm$^2$/$_5$ | 222.7 |
| ASTM D4294 | Total Sulfur Content, % (m/m) | 0.351 |
| IP501 | Aluminum, mg/kg | 20 |
|  | Silicon, mg/kg | 28 |
|  | Aluminum + Silicon, mg/kg | 48 |
| ASTM D4870 | Accelerated Total Sediment, % (m/m) | 0.03 |
|  | Potential Total Sediment, % (m/m) |  |
| ASTM D4740 | Cleanliness Rating | 1 |
|  | Compatibility Rating | 2 |

Figure 2:
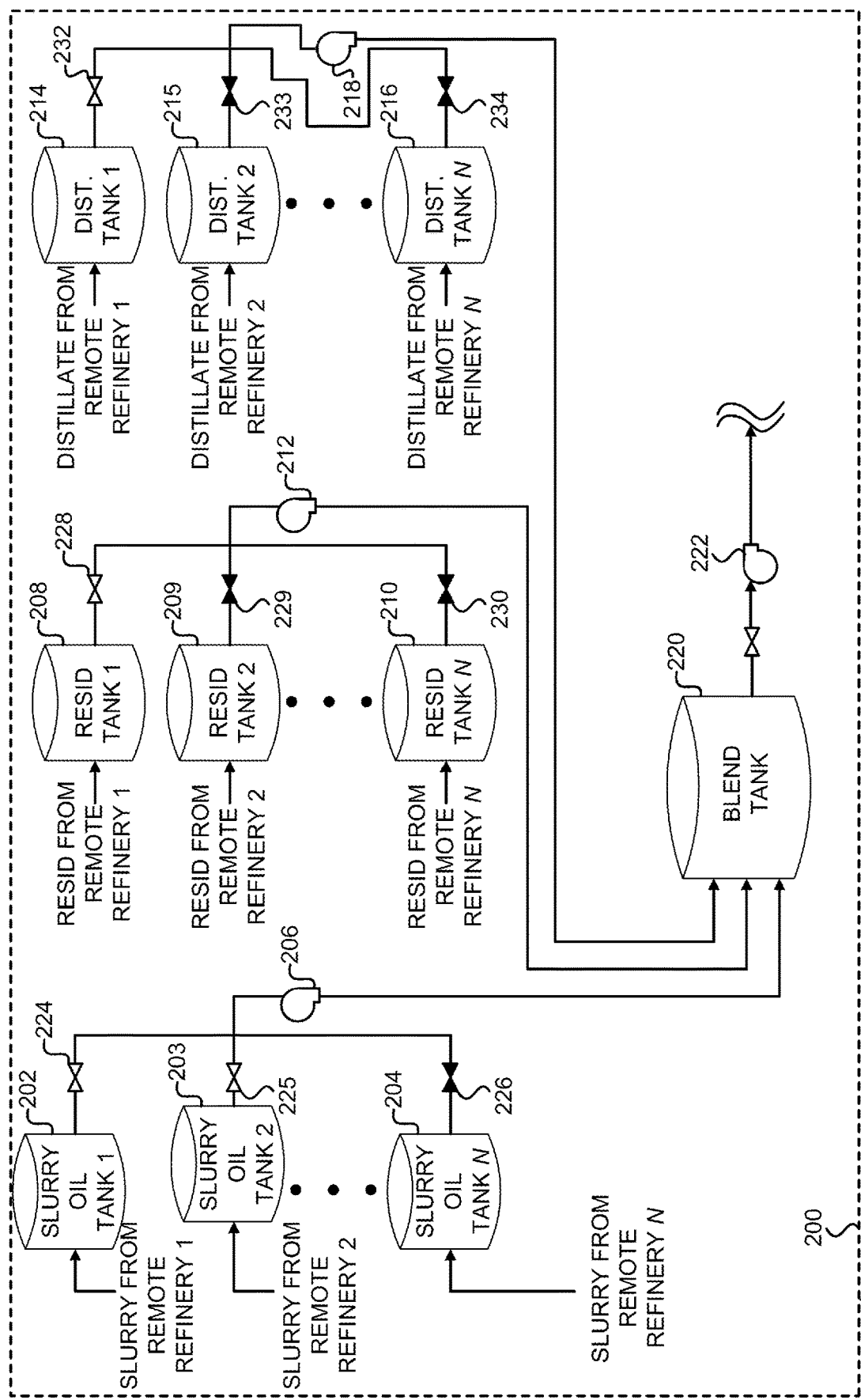
FIG. 2 is a schematic diagram of a terminal that receives and stores various resids, slurry oils, and distillates for blending to create a low sulfur fuel oil for marine applications, according to one or more embodiments disclosed herein.
Figure 3:
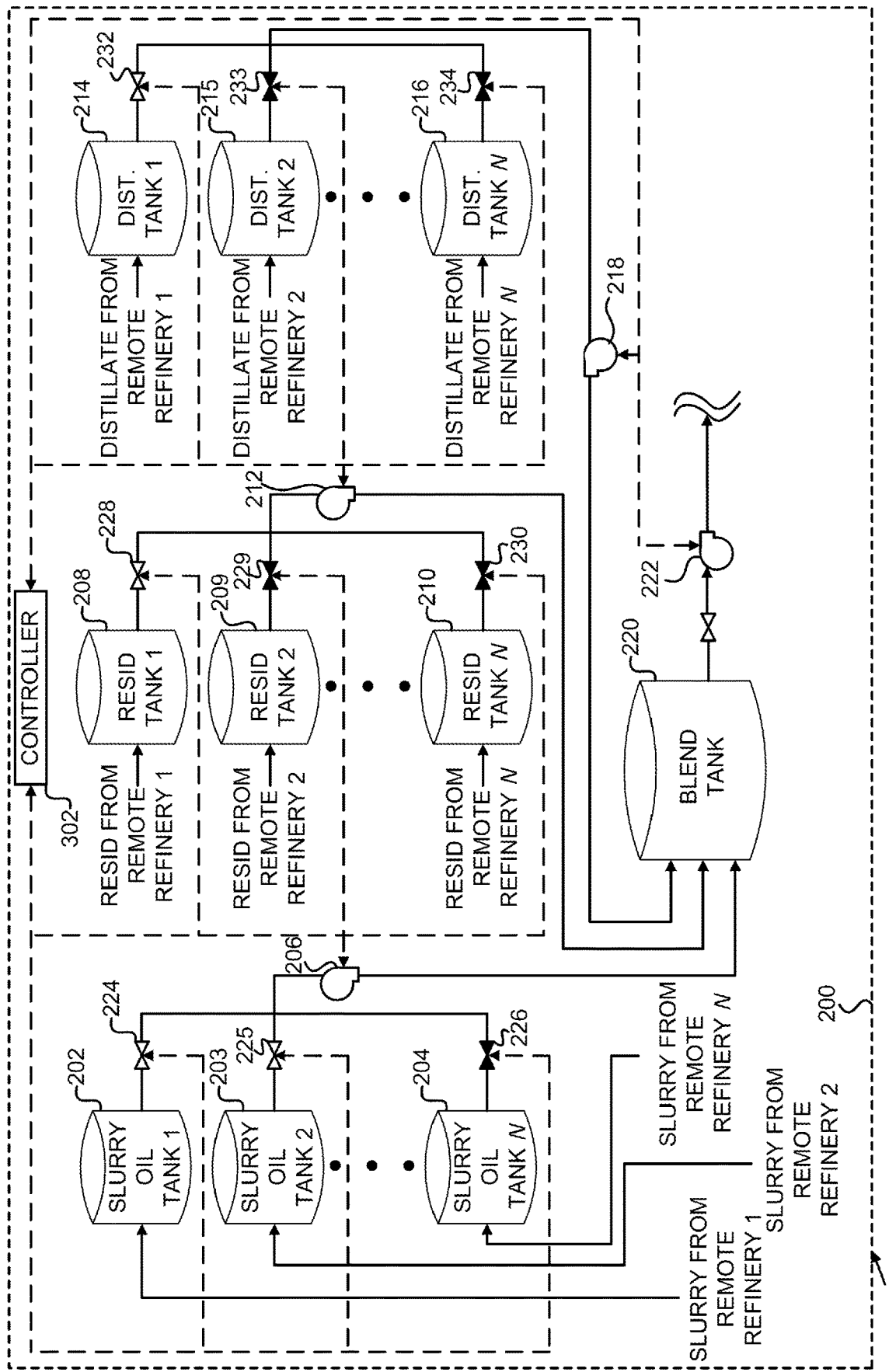
FIG. 3 is a schematic diagram of the terminal of FIG. 2 in which one or more controllers coordinate the blending of specific components to create the low sulfur fuel oil for marine application, according to one or more embodiments disclosed herein.

FIG. 2 is a schematic diagram of a terminal 200 that receives and stores various resids, slurry oils, and distillates for blending to create a low sulfur fuel oil for marine applications, according to one or more embodiments disclosed herein. FIG. 3 is a schematic diagram of the terminal 200 of FIG. 2 in which one or more controllers (e.g., controller 302) coordinate the blending of specific components to create the low sulfur fuel oil for marine application, according to one or more embodiments disclosed herein. In an example, the terminal 200 may include various tanks to store and receive the various resids, slurry oils, and distillates from various sources, such as from different and remote refineries. The various resids, slurry oils, and distillates may be combined in a specified order and mixed or blended for a specified length of time in a blend tank 220. After the various resids, slurry oils, and distillates are blended the resulting blend or mixture may be pumped, via pump 222, to another tank, a vehicle for shipment, or to another location or terminal external to terminal 200.

In an example, the various resids, slurry oils, and distillates may be mixed in a specified order. In such examples, as the various resids, slurry oils, and distillates are added to the blend tank 220, the added various resids, slurry oils, and distillates may mix or blend before additional various resids, slurry oils, and distillates are added. As an example, slurry oil tanks (e.g., slurry oil tank 202, slurry oil tank 2 203, and/or up to slurry oil tank N 204) may receive slurry oil of varying aromatic content, weight (e.g., as measured by density or gravity), sulfur content, asphaltene content, and/or exhibiting other characteristics, as described throughout. Further, the resid tanks (e.g., resid tank 1 208, resid tank 2 209, and/or up to resid tank N 210) may receive resid of varying aromatic content, weight (e.g., as measured by density or gravity), sulfur content, asphaltene content, and/or exhibiting other characteristics, as described throughout. Further still, the distillate tanks (e.g., distillate tank 1 214, distillate tank 2 215, and/or up to distillate tank N 216) may receive distillate of varying aromatic content, weight (e.g., as measured by density or gravity), sulfur content, asphaltene content, and/or exhibiting other characteristics, as described throughout.

As the various resids, slurry oils, and distillates are received at the terminal 200, the characteristics may be transported or transferred (e.g., transmitted) to the terminal 200 or a controller 302. In such examples, the characteristics may be transported or transferred to the terminal 200 or controller 302 as an electronic record (e.g., via a machine readable storage medium or via an electronic or signal communication), as a paper form, as a ticket, or as another suitable medium for transporting or transferring information. Once the terminal 200 has received the appropriate components for a particular or specified blend and once the terminal 200 and/or controller 302 has received the corresponding data, the terminal 200, controller 302, or a user may initiate a blending operation or process.

In response to initiation of a blending operation or process, a user and/or the controller 302 may select a first slurry oil (e.g., from slurry oil tank 1 202) and a second slurry oil (e.g., from slurry oil tank 2 203). In another example, other slurry oils may be selected from other slurry tanks. In another example, all slurry oils to be blended and/or all of the various resids, slurry oils, and distillates may be selected prior to initialization of the blending operation or process, by the user and/or the controller 302. In yet another example, the various resids, slurry oils, and distillates may be selected at different times or intervals of the blending operation or process.

Once a first slurry oil (e.g., from slurry oil tank 1 202) and a second slurry oil (e.g., from slurry oil tank 2 203) are selected, the first slurry oil (e.g., from slurry oil tank 1 202) and a second slurry oil (e.g., from slurry oil tank 2 203) may be transported or pumped, via pipeline and pump 206, to a blend tank. Valves (e.g., valve 224 and valve 225) may be opened to allow the corresponding slurry oil to flow to the blend tank 220. Each of the slurry oil tanks (e.g., slurry oil tank 1 202, slurry oil tank 2 203, and/or up to slurry oil tank N 204) may be in fluid communication with a valve (e.g., valve 224, valve 225, and valve 226, respectively) to allow fluid to flow to the blend tank 220 upon opening of the valve. Once the blend tank 220 contains the first slurry oil and second slurry oil, the first slurry oil and second slurry oil (or any other components added at that point) may be blended together for a specified period of time, to ensure proper blending. In an example, the first slurry oil may have a high aromatic content (e.g., greater than about 70% by weight), while the second slurry oil may have a lower aromatic content (e.g., less than about 70% by weight).

Once the first slurry oil and the second slurry oil are mixed or blended, a user or controller 302 may select another slurry oil for blending. The other slurry oil may include an aromatic content less than that of the second slurry oil and closer to the aromatic content of the resid to be mixed (e.g., within 1% to 20%). In an example, the next slurry oil or component to be mixed may be preselected. In other words, all the selected various resids, slurry oils, and distillates may be preselected and loaded into the controller 302 for scheduled mixing or blending (e.g., different components blended for various time intervals and other components added for mixing at other time intervals). In another example, the user or controller 302 may select the next slurry oil or various resids and distillates for blending. The selection may be automatic or a prompt may be displayed on a user interface (e.g., a display or a computing device (e.g., laptop, phone, desktop with display, or terminal)). The user interface may be in signal communication with the controller 302. The prompt may include a list of other available resids, slurry oils, and distillates and the characteristics of those components.

If another slurry oil is selected, the selected slurry oil may be transported or pumped, via pipeline and pump 206, to the blend tank 220. The other slurry oil may then be mixed with the current mixture in the blend tank 220 for a specified period of time. In another example, the characteristics of such a blend or mixture (as well as at any point during the blending operation or process) may be measured either manually (e.g., physically taking a sample and measuring the characteristics in a nearby lab) or via sensors disposed in or on the blend tank 220. Such characteristics may be provided to the user and/or the controller 302. The characteristics may be utilized, by the user and/or the controller 302, to determine if other slurry oils (as well as which resids or distillates) should be added to the mixture or blend. As noted above, in another example, the slurry oils, resids and/or distillates to be blended or mixed may all be preselected before initiation of the blending operation or process.

Once the mixture or blend in the blend tank 220 contains the proper percentage of aromatics (i.e., stepped down in its percentage of aromatics toward the aromatic content of the resid) or if a component of the mixture or blend in the blend tank 220 is of the proper aromatic content (e.g., close to the aromatic content of the resid, such as within 1% to 20% thereof), one or more resids (e.g., from resid tank 1 208, resid tank 2 209, and/or up to resid tank N 210) may be added to the blend tank 220. The one or more resids may have an aromatic content less than that of the first slurry oil and second slurry oil. The resids aromatic content may be close to that of the last slurry oil added to the blend tank 220 (e.g., within about 1% to 20%). The resid may have an aromatic content of less than about 50% by weight. The resids may be added from each corresponding selected resid tanks (e.g., resid tank 1 208, resid tank 2 209, and/or up to resid tank N 210) by opening an associated valve (e.g., valve 228, valve 229, and/or up to valve 230, respectively) and pumping the resid, via pipeline and pump 212, to the blend tank 220. Once the selected resid is added to the blend tank, the resid may be mixed for a specified amount of time.

In some examples, the total weight of the mixture may be too heavy, per specifications. In such examples, the user or controller 302 or based on a preselection may select a distillate to add into the mixture or blend. In another example, the mixture or blend may include too much sulfur by weight, resulting in prevention of classification as a low sulfur fuel. In such cases, distillate with a low sulfur content may be added to the mixture or blend in the blend tank 220. In either case, if a distillate is selected (e.g., from distillate tank 1 214, distillate tank 2 215, and/or up to distillate tank N 216), the corresponding valve (e.g., valve 232, valve 233, and/or up to valve 234, respectively) may be opened to allow for flow of the selected distillate. Further, a pump 218 may pump the distillate to the blend tank 220 via pipeline. In one or more embodiments, the distillate may be added after the last of the slurry oils is added to the blend tank 220 but prior to the resid being added to the blend tank 220. In one or more other embodiments, the distillate may be added after the resid is added to the blend tank 220.

Once the mixture or blend meets specification or once the specified components have been mixed, the characteristics of the mixture or blend may be determined to ensure that the mixture or blend meets specification. In another example, rather than determining characteristics, the mixture or blend may be transported, via pipeline and pump 222, to another tank, a vehicle for shipment, or to another location or terminal external to terminal 200.

Figure 4:
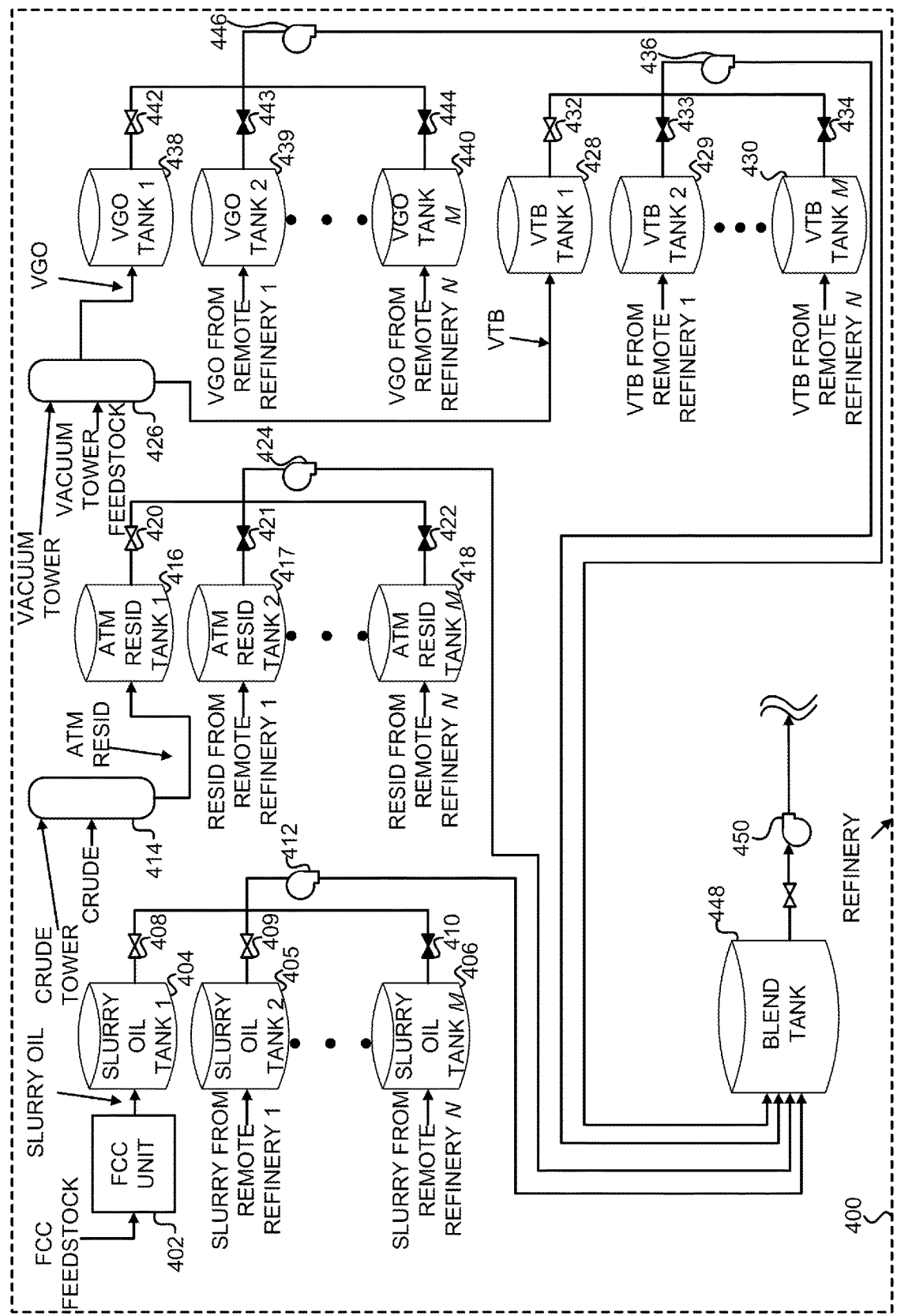
FIG. 4 is a schematic diagram of a refinery that produces one or more resids, one or more slurry oils, and one or more distillates (e.g. sweet gas oils, diesel fuel, jet fuel, kerosene, etc.) and stores one or more resids, one or more slurry oils, and one or more distillates acquired from outside the refinery for blending to create a low sulfur fuel oil for marine applications, according to one or more embodiments disclosed herein.

FIG. 4 is a schematic diagram of a refinery 400 that produces one or more resids, one or more slurry oils, and one or more distillates (e.g. vacuum gas oils) and stores one or more resids, one or more slurry oils, and one or more distillates acquired from outside the refinery for blending to create a low sulfur fuel oil for marine applications, according to one or more embodiments disclosed herein. As described above, various components may be mixed at various times and in varying order based on the different characteristics. For example, various slurry oils from the refinery 400 and/or remote refinery may be mixed in the blend tank 448, then a resid (e.g., ATB or VTB) may be added and mixed in the blend tank 448, and then vacuum gas oils (VGO) or other distillates/cutter stocks may be added and mixed in the blend tank 448. The slurry oils may be mixed first to achieve a mixture of an aromatic content by weight percentage close to that of the resid to be mixed. Further, the distillates (e.g., VGO) may be added to further alter the characteristics of the mixture or blend (e.g., sulfur content or overall weight).

For example, one or more slurry oils may be selected for a blending operation or process. In such examples, the slurry oils may be provided from within the refinery 400 or from a remote refinery. For example, a fluid catalytic cracker (FCC) 402 may produce slurry oil to be stored and/or used in the blending operation or process (e.g., stored in slurry oil tank 1 404). Other slurry oils produced at the refinery 400 may be stored in other slurry oil tanks. In another example, slurry oil may be transported from remote refineries for use in the blending operations or processes (e.g., stored in slurry oil tank 2 405 and/or up to slurry oil tank M 406). Each slurry oil tank (e.g., slurry oil tank 1 404, slurry oil tank 2 405, and/or up to slurry oil tank M 406) may be in fluid communication with a valve (e.g., valve 408, valve 409, and/or up to valve 410) to, when opened, allow for pumping, via pump 412, to the blend tank 448.

Similarly, one or more resids may be selected for the blending operation or process. In such examples, the atmospheric resid may be produced at a crude tower 414 within the refinery 400 and/or be produced at a remote refinery. The atmospheric resid may be stored in one or more resid tanks (e.g., atmospheric resid tank 1 416, atmospheric resid tank 2 417, and/or up to atmospheric resid tank M 418). A resid tank (e.g., atmospheric resid tank 1 416, atmospheric resid tank 2 417, and/or up to atmospheric resid tank M 418) may be in fluid communication with a corresponding valve (e.g., valve 420, valve 421, and/or up to valve 422) to, when opened, allow for pumping, via pump 424, of the selected one or more resid to the blend tank 448. Similarly, the vacuum resid from a vacuum tower may be stored in one or more resid tanks (e.g., VTB tank 1 428, VTB tank 2 429, and/or up to VTB tank M 430). As shown in FIG. 4, the VTB may also be provided by an external or remote refinery. A VTB tank (e.g., VTB tank 1 428, VTB tank 2 429, and/or up to VTB tank M 430) may be in fluid communication with a corresponding valve (e.g., valve 432, valve 433, and/or up to valve 434) to, when opened, allow for pumping, via pump 436, of the selected one or more VTB to the blend tank 448.

Similarly, one or more distillates may be selected for the blending operation or process. In such examples, the distillates may include a VGO from a vacuum tower 426 or another distillate, e.g., diesel fuel, jet fuel, kerosene, etc., from the atmospheric tower or elsewhere within the refinery 400. In another example, the VGO and/or other distillate may be provided by an external or remote refinery. The VGO may be stored in one or more VGO tanks (e.g., VGO tank 1 438, VGO tank 2 439, and/or up to VGO tank M 440). A VGO tank (e.g., VGO tank 1 438, VGO tank 2 439, and/or up to VGO tank M 440) may be in fluid communication with a corresponding valve (e.g., valve 442, valve 443, and/or up to valve 444) to, when opened, allow for pumping, via pump 446, of the selected one or more VGO to the blend tank 448. While described herein as VGO tanks, those skilled in the art will readily recognize that any distillate may be pumped into, stored and pumped out such tanks.

The mixture or blend produced at the blend tank 448 may be transported via pipeline and pump 450 to another tank, a vehicle for shipment, or to another location or terminal external to refinery 400. The refinery 400 may include one or more controllers (similar to the terminal of FIG. 3). The one or more controllers may allow for control and monitoring of the various processes and components within the refinery 400, particularly the blending or mixing operation or process, the cracking or FCC process, the process related to the crude tower 414, the process related to the vacuum tower 426, the opening and closing of valves disposed throughout the refinery 400, the pumps disposed throughout the refinery 400, and/or each tank storing the various liquids or components within the refinery 400.

Figure 5:
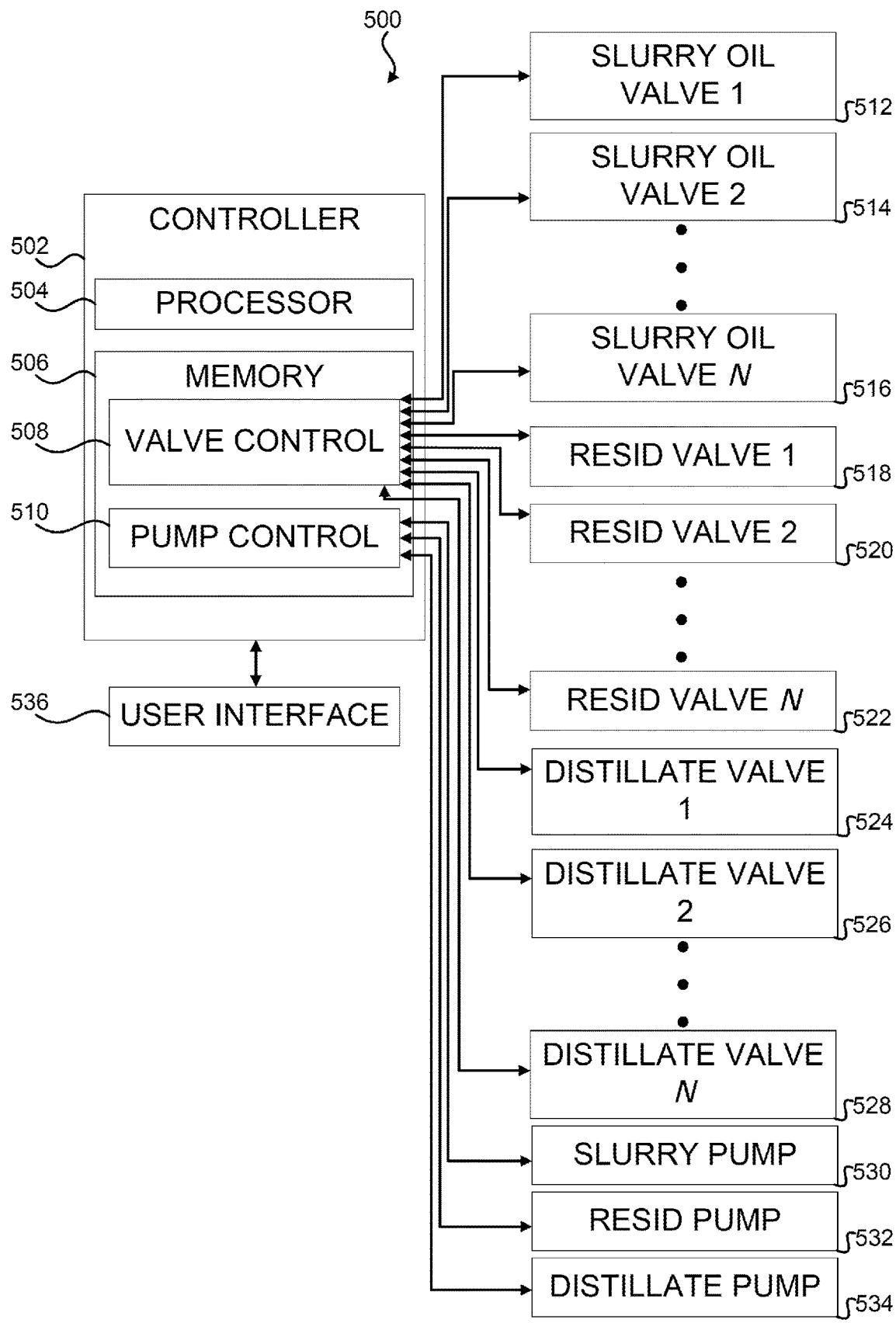
FIG. 5 is a simplified diagram illustrating a control system for managing the blending of components to create a low sulfur fuel oil for marine applications, according to one or more embodiments disclosed herein.

FIG. 5 is a simplified diagram illustrating a control system 500 for managing the blending of components to create a low sulfur fuel oil for marine applications, according to one or more embodiments disclosed herein. In an example, the control system may include a controller 502 or one or more controllers. Further the controller 502 may be in signal communication with various other controllers throughout or external to a refinery or terminal. The controller may be considered a supervisory controller. In another example, a supervisory controller may include the functionality of controller 502.

Each controller described above and herein may include a machine-readable storage medium (e.g., memory 506) and one or more processors (e.g., processor 504). As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory 506 may store or include instructions executable by the processor 504. As used herein, a "processor" may include, for example one processor or multiple processors included in a single device or distributed across multiple computing devices. The processor 504 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

The controller 502 may include instructions 508 to control valves disposed throughout the refinery or terminal. In such examples, the controller 502 may determine when to open and close different valves. For example, if two particular slurry oils are selected, when those slurry oils are to be mixed, the controller 502 may open the corresponding valves. The controller 502 may be in signal communication with those valves (e.g., slurry oil valve 1 512, slurry oil valve 2 514, up to slurry oil valve N 516, resid valve 1 518, resid valve 2 520, up to resid valve N 522, distillate valve 1 524, distillate valve 2 526, and up to distillate valve N 528). In another example, the controller 502 may control whether each valve is open or closed. In yet another example, the controller 502 may control the degree or percentage that each valve is open. The controller 502 may also control the length of time to keep each valve open. In other words, the controller 502 may close a particular valve after a sufficient amount of the corresponding component has been added to the blend tank.

The controller 502 may also include instructions to control each of the pumps disposed throughout the refinery or terminal (e.g., slurry pump 530, resid pump 532, and/or distillate pump 534). The controller 502 may determine whether a pump should be activated based on a corresponding valve to be opened. In another example, each or some of the pumps may be a variable speed or variable frequency drive pump. In such examples, the controller 502 may determine the speed or frequency of the pump and set the pump at that speed or frequency based on the corresponding liquid (e.g., based on the viscosity of the liquid).

The controller 502 may also be in signal communication with a user interface 536. The user interface 536 may display information regarding a blending operation or process, as well as data related to each of the valves and pumps located at a refinery or terminal. In another example, a user may enter at the user interface data or an initiation to start the blending operation or process. In another example, a user may enter in various selections (e.g., different slurry oils, resids, and/or distillate) at the user interface 536 and, based on such selections, the controller 502 may open and close corresponding valves and activate pumps at the proper time to ensure the selected liquids are pumped to and mixed in a blend tank at the correct time and for a correct length of time. Further, the controller 502 may transmit or send prompts or other information to the user interface 536

Figure 6:
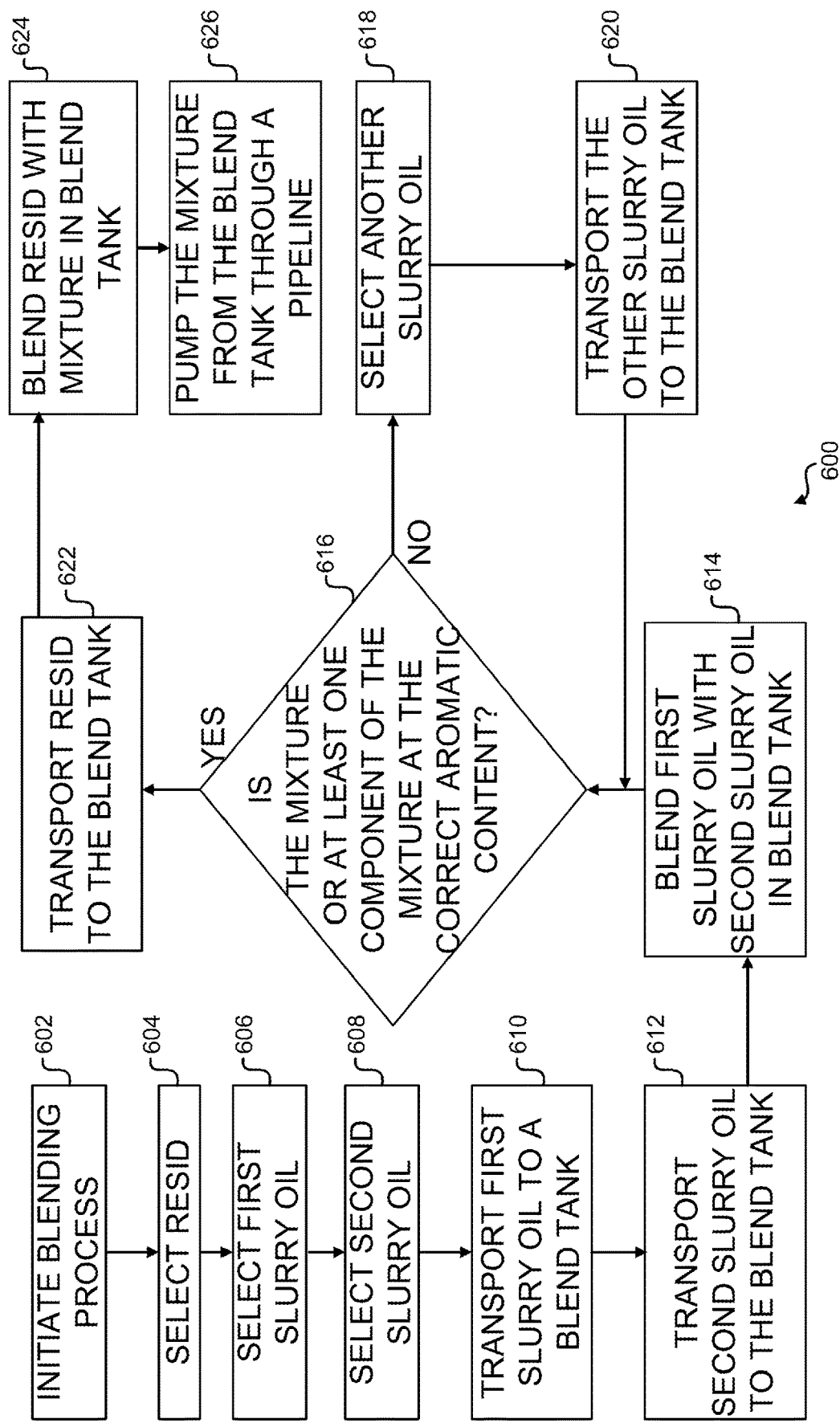
FIG. 6 is a flow diagram, implemented by a controller, for managing the blending of components to create a low sulfur fuel oil for marine applications, according to one or more embodiments disclosed herein.

FIG. 6 is a flow diagram, implemented by a controller, for managing the blending of components to create a low sulfur fuel oil for marine applications, according to one or more embodiments disclosed herein. The method 600 is detailed with reference to the terminal 200 of FIGS. 2 and 3. Unless otherwise specified, the actions of method 600 may be completed within the controller 302. Specifically, method 600 may be included in one or more programs, protocols, or instructions loaded into the memory of the controller 302 and executed on the processor or one or more processors of the controller 302. The order in which the operations are described is not intended to be construed as a limitation, and any number of the described blocks may be combined in any order and/or in parallel to implement the methods.

At block 602, the blending operation or process may be initiated. In an example, a user and/or the controller 302 may initiate the blending operation or process. In such examples, a user may initiate the blending operation or process via a user interface in signal communication with the controller 302. In another example, a controller 302 may initiate the blending operation or process when selected components are available.

At block 604, a user or controller 302 may select one or more resids from available resids at the terminal 200 or refinery, based on resids currently stored at the terminal 200 or refinery (e.g., from resid tank 1 208, resid tank 2 209, and/or up to resid tank N 210). In an example the resid may include an aromatic content of less than about 50%.

At block 606 and 608, the user or controller 302 may select a first slurry oil and a second slurry oil, respectively, from available slurry oils at the terminal 200 or refinery, based on slurry oils stored at the terminal 200 or refinery (e.g., from slurry oil tank 1 202, slurry oil tank 2 203, and/or up to slurry oil tank N 204). In an example, the first slurry oil may include a high aromatic content (e.g., 70% to 80% or higher per weight). In another example, the second slurry oil may include an aromatic content slightly lower than the first slurry oil (e.g., within about 5%, within about 10%, within about 15%, or even within about 20%). In another example, the second slurry oil may include an aromatic content at a lower aromatic content (e.g., less than 70% by weight). In another example, other slurry oils, resids, or distillates may be selected for the blending operation or process before or after the actual blending or mixing occurs.

At block 612, the first selected slurry oil and second selected slurry oil may be transported to the blend tank 220 (e.g., via corresponding valves, pipeline, and/or pumps). At block 614, the blend tank may blend the first selected slurry oil and second selected slurry for a specified period or interval of time. In another example, rather than checking the aromatic content at this point, the further selected slurry oils, resids, and/or distillates may be mixed, in the proper sequence (e.g., but not to be limiting, in the order of slurries, resids and distillates), and pumped and transported from the blend tank 220.

In another example, at block 614, the controller 302 or a user may check the aromatic content (i.e., the percentage of aromatics therein) of the current mixture in the blend tank 220 and verify that the aromatic content is close to that of the selected resid (e.g., within 1% to 20%, within 12% to 18%, within 14% to 16%, etc.). In another example, the controller 302 may verify that at least one component currently in the mixture is close to the aromatic content of the selected resid (e.g., within 1% to 20%, within 12% to 18%, within 14% to 16%, etc.). In either example, if the aromatic content is not near that of the selected resid, the controller 302 or a user may select another slurry oil, at block 618, which may then be transported, at block 620, to the blend tank 220.

Once the aromatic content (i.e., the percentage of aromatics) in the mixture is near that of the selected resid, at block 622, the resid may be transported to the blend tank 220. At block 624, the resid may be mixed with the current mixture at the blend tank 624. In another example, the current characteristics of the blend or mixture may be determined and compared to a specification of a target low sulfur fuel or marine fuel. In such examples, if the specifications are not met (e.g., sulfur content is too high or weight is too high), a low sulfur distillate and/or a heavy distillate may be selected and transported to the blend tank for mixing with the current mixture or blend at the blend tank 220. At block 626, the final blend or mixture may be pumped from the blend tank 220, via a pump 222, to an end user.

As is known to those skilled in the art, resid or residuum is any refinery fraction left behind after distillation. Resid may refer to atmospheric tower bottoms and/or vacuum tower bottoms.

Atmospheric tower bottoms (ATB), also called long resid, is the heaviest undistilled fraction (uncracked) in the atmospheric pressure distillation of a crude oil, as is known to those skilled in the art. ATB has crude oil components with boiling points above about 650° F. (343° C.), which is below the cracking temperature of the crude oil.

Vacuum tower bottoms (VTB), also called short resid, is the heaviest undistilled fraction (uncracked) in the vacuum distillation of a hydrocarbon feedstock, as is known to those skilled in the art. VTBs may have one or more of the following characteristics: a density at 15° C. of between about 0.8 and about 1.1 g/ml, a sulfur content of between about 1.0 and about 3.0 wt %, a pour point of between about −20 and about 75° C., a kinematic viscosity of between about 50 and about 12,000 cSt (50° C.), a flash point of between about 50 and about 200° C., and an API density of between about 3.0 and about 20. Moreover, VTBs generated from sweet run hydrocarbon feedstock (e.g., hydrotreated feedstock to the vacuum tower) may have sulfur content below about 1.0 wt %, below about 0.9 wt %, below about 0.8 wt %, below about 0.7 wt %, below about 0.6 wt %, below about 0.5 wt %, below about 0.4 wt %, below about 0.3 wt % or even below about 0.2 wt %.

Decant oil (DCO), also known as slurry oil, is a high-boiling catalytic cracked aromatic process oil and is the heaviest cut off of a fluid catalytic cracker unit, as is known to those skilled in the art. Decant oil may have one or more of the following characteristics: a density at 15° C. of between about 0.9 and about 1.2 g/ml, a sulfur content of between about 0.20 and about 0.50 wt %, a pour point of between about −5 to about 5° C., a kinematic viscosity of between about 100 and about 200 cSt (50° C.), a flash point between about 50 and about 150° C., and an API of between about −1.0 and about 1.0.

Vacuum gas oil (VGO) may be light and/or heavy gas oil cuts from the vacuum distillation column, as is known to those skilled in the art. VGO may have one or more of the following characteristics: a density at 15° C. of between about 0.85 and about 1.1 g/ml, a sulfur content of between about 0.02 and about 0.15 wt %, a pour point of between about to 15 about 35° C., a kinematic viscosity of between about 15 and about 35 cSt (50° C.), a flash point between about 100 and about 175° C., and an API of between about 15 and about 30.

Cycle oil is the diesel-range, cracked product from the fluid catalytic cracker unit, as is known to those skilled in the art. Cycle oil may be light, medium or heavy and may have one or more of the following characteristics: a density at 15° C. of between about 0.75 and about 1.0 g/ml, a sulfur content of between about 0.01 and about 0.25 wt %, a kinematic viscosity of between about 2 and about 50 cSt (50° C.), a flash point between about 50 and about 70° C., and an API of between about 25 and about 50.

The ISO 8217, Category ISO-F RMG 380 specifications for residual marine fuels are given below in TABLE XIII As used in this disclosure, achieving or meeting the IMO 2020 specifications per ISO 8217 for a particular fuel oil blend is with respect to the values for the blend characteristics as listed in Table XIII below and as confirmed by the respective test methods and/or references provided in ISO 8217. As understood by those skilled in the art, the other specifications provided in ISO 8217, e.g., RMA, RMB, RMD, RME, and RMK, may sought to be achieved by adjusting the blend compositions.

TABLE XIII

| Characteristics | Unit | Limit | Category ISO-F RMS 380 | Test Method(s) and References |
|---|---|---|---|---|
| Kinematic Viscosity @ 50° C. | cSt | Max | 380.0 | ISO 3104 |
| Density @ 15° C. | kg/m$^3$ | Max | 991.0 | ISO 3675 or ISO 12185 |
| CCAI | | Max | 870 | Calculation |
| Sulfur | mass % | Max | 0.5 | ISO 8754 or ISO 14596 or ASTM D4294 |
| Flash Point | ° C. | Min | 60.0 | ISO 2719 |
| Hydrogen Sulfide | mg/kg | Max | 2.00 | IP 570 |
| Acid Number | mgKOH/g | Max | 2.5 | ASTM D664 |
| Total Sediment-Aged | mass % | Max | 0.10 | ISO 10307-2 |
| Carbon Residue-Micro Method | mass % | Max | 18.00 | ISO 10370 |
| Pour Point (upper)   Winter | ° C. | Max | 30 | ISO 3016 |
|                      Summer | ° C. | Max | 30 | |
| Water | vol % | Max | 0.50 | ISO 3733 |
| Ash | mass % | Max | 0.100 | ISO 6245 |
| Vanadium | mg/kg | Max | 350 | IP 501, IP 470 or ISO 14597 |
| Sodium | mg/kg | Max | 100 | IP 501, IP 470 |
| Al + Si | mg/kg | Max | 60 | IP 501, IP 470 or ISO 10478 |
| Used Lubricating Oil (ULO): Ca and Z or Ca and P | mg/kg | Max | Ca > 30 and Z > 15 or CA > 30 and P > 15 | IP 501 or IP470, IP 500 |

The present application is a continuation of U.S. Non-Provisional application Ser. No. 17/832,339, filed Jun. 3, 2022, titled "Low Sulfur Fuel Oil Blends for Paraffinic Resid Stability and Associated Methods," which is a continuation of U.S. Non-Provisional application Ser. No. 17/249,079, filed Feb. 19, 2021, titled "Low Sulfur Fuel Oil Blends for Paraffinic Resid Stability and Associated Methods," now U.S. Pat. No. 11,352,577, issued Jun. 7, 2022, which claims priority to and the benefit of U.S. Provisional Patent Application No. 62/978,798, filed Feb. 19, 2020, titled "Low Sulfur Fuel Oil Blending for Stability Enhancement and Associated Methods," and U.S. Provisional Patent Application No. 63/199,188, filed Dec. 11, 2020, titled "Low Sulfur Fuel Oil Blending for Paraffinic Resid Stability and Associated Methods," the disclosures of which are incorporated herein by reference in their entirety.

In the drawings and specification, several embodiments of low sulfur fuel oil blend compositions and methods of making such blend compositions are disclosed that increase stability and compatibility of paraffinic resids that are blended with slurry oils having higher asphaltene and/or aromatic contents. Although specific terms are employed, the terms are used in a descriptive sense only and not for purposes of limitation. Embodiments of systems and methods have been described in considerable detail with specific reference to the illustrated embodiments. However, it will be apparent that various modifications and changes to disclosed features can be made within the spirit and scope of the embodiments of systems and methods as may be described in the foregoing specification, and features interchanged between disclosed embodiments. Such modifications and changes are to be considered equivalents and part of this disclosure.

What is claimed is:

1. A method for creating a stable asphaltene containing residuum based marine fuel oil blend, the method comprising:
   determining a first selection of one or more of an asphaltene containing residuum to define one of a plurality of blend components;
   determining a second selection of one or more of a high aromatic distillate, a hydrocarbon fraction, or a cracked stock to define one of the plurality of blend components;
   determining a third selection of one or more of an intermediate aromatic distillate, a hydrocarbon fraction, or a cracked stock with an aromaticity greater than the first selection and less than the second selection to define one of the plurality of blend components;
   determining a sequence of addition for each one of a plurality of blend components into a blend tank;
   adding each one of the plurality of blend components to the blend tank at a specified time based on the sequence of addition until each of the one of the plurality of blend components have been added to the blend tank; and
   mixing each added blend component in the blend tank for a specified period of time prior to addition of a next one of the plurality blend components, each added blended component to define a stable asphaltene containing residuum based marine fuel oil blend.

2. The method of claim 1, wherein the stable asphaltene containing residuum based marine fuel oil blend comprises saturates less than about 50% by weight, aromatics greater than about 40% by weight, resins less than about 15% by weight, and asphaltenes less than about 15% by weight.

3. The method of claim 2, wherein the one or more of an intermediate aromatic distillate, hydrocarbon fraction, or cracked stock has an aromatic content within about 20% of the one or more high aromatic distillate, hydrocarbon fraction, or cracked stock blend component.

4. The method of claim 1, wherein the sequence of addition of the plurality of blend components includes a decrease from one of the plurality of blend components from the highest aromaticity followed by the next highest aromaticity, and wherein each addition has a difference in aromaticity of less than about 20% by weight than the prior addition.

5. The method of claim 1, wherein the residuum comprises an asphaltene containing processing bottoms from heavy oil or bitumen refining.

6. The method of claim 1, wherein the cracked stock comprises thermal and catalytically cracked organic compounds.

7. The method of claim 6, wherein one of the plurality of blend components comprises a low sulfur cutter stock.

8. A method for creating a stable asphaltene containing residuum based marine fuel oil blend, the method comprising:
   providing a first blend component having a first aromatic content to a blend tank, the first blend component comprising one or more of a high aromatic distillate, a hydrocarbon fraction, or a cracked stock;
   providing a second blend component having a second aromatic content lower than the first aromatic content to the blend tank to form a mixture, the second blend component comprising one or more of an intermediate aromatic distillate, a hydrocarbon fraction, or a cracked stock; and
   after forming the mixture, providing an asphaltene containing residuum to the blend tank to form the stable asphaltene containing residuum based marine fuel oil blend, the asphaltene containing residuum having an aromatic content less than the first aromatic content of the first blend component and the second aromatic content of the second blend component.

9. The method of claim 8, wherein the stable asphaltene containing residuum based marine fuel oil blend comprises saturates less than about 50% by weight, aromatics greater than about 40% by weight, resins less than about 15% by weight, and asphaltenes less than about 15% by weight.

10. The method of claim 9, wherein the one or more of an intermediate aromatic distillate, hydrocarbon fraction, or cracked stock has an aromatic content within about 20% of the one or more high aromatic distillate, hydrocarbon fraction, or cracked stock blend component.

11. The method of claim 8, wherein the first blend component comprises a first slurry oil and the second blend component comprises a second slurry oil.

12. The method of claim 8, wherein the residuum comprises an asphaltene containing processing bottoms from heavy oil or bitumen refining.

13. The method of claim 8, wherein the cracked stock comprises thermal and catalytically cracked organic compounds.

14. The method of claim 8, further comprising providing a low sulfur cutter stock to the blend tank after providing the asphaltene containing residuum to the blend tank.

15. A method to provide a resid based fuel via blending for marine fuel oil applications, the method comprising:
   determining, via a controller and based on signals from a corresponding sensor, one or more characteristics of one or more fuel blend components;

determining, via the controller, a combination of the one or more fuel blend components, based on the one or more characteristics, to meet a fuel blend specification;

determining, via the controller, a sequence of addition for the combination of the one or more fuel blend components such that an aromaticity of each successive addition has an aromaticity less than an aromaticity of a prior addition or a mixture of prior additions;

transferring the one or more fuel blend components in the sequence of addition to a blend tank; and mixing, after each addition of the one or more fuel blend components, the added fuel blend components for a specified length of time to provide a marine fuel oil.

16. The method of claim 15, further comprising:
determining, via the controller and based on signals from a second corresponding sensor, the aromaticity of the mixture of fuel blend components after each addition; and adjusting the sequence of addition when the next addition has an aromaticity that is more than 20% by weight less than the aromaticity of the mixture of fuel blend components.

17. The method of claim 15, further comprising:
determining the characteristics of the mixture of fuel blend components after a final addition to confirm that the mixture of fuel blend components meets the fuel blend specification; and transferring one or more additional fuel blend components through pumps, pipelines, and valves operated by the controller to adjust the mixture of blend components characteristics to meet the fuel blend specification.

18. The method of claim 15, wherein a final fuel blend component in the sequence of addition comprises a resid.

19. The method of claim 15, wherein the controller is in signal communication with a sensor disposed in or on the blend tank to measure characteristics of the mixture of fuel blend components.

20. The method of claim 15, wherein the one or more characteristics of the one or more fuel blend components comprise sulfur content, aromaticity, density, or aged sediment content.

21. A system for blending a residuum containing marine fuel oil, the system comprising:
a source of one or more blend components, at least one of one or more blend components including residuum;
a blend tank configured to mix the one or more blend components, the blend tank including:
an inlet configured to receive each of the one or more blend components; and
an outlet connected to and in fluid communication with a pipeline for discharge;
a controller configured to:
receive signals indicating a position of one or more valves associated with each of the one or more blend components and the blend tank; and
transmit signals to adjust the position of one or more of:
the one or more valves associated with the one or more blend components; and
the one or more valves associated with the blend tank according to a sequence of addition of the blend components to produce a blended fuel based on an international marine organization (IMO) fuel specification.

22. The system of claim 21, wherein the sequence of addition comprises a pre-selected sequence of addition, a manually selected sequence of addition, or an automatically generated sequence of addition generated by the controller.

23. The system of claim 21, wherein the blend tank includes a sensor configured to measure aromatic content of a current blend of blend components in the blend tank.

24. The system of claim 23, wherein the controller is in signal communication with the sensor of the blend tank, and wherein the controller further is configured to:
determine whether the aromatic content is within a specified range in the IMO fuel specification; and
in response to a determination that the aromatic content is not within the specified range in the IMO fuel specification, transmit signals to adjust the position of one or more of each valve of the one or more storage tanks to add another blend component to adjust the aromatic content.

25. The system of claim 24, wherein the controller further is configured to, in response to a determination that the aromatic content is within the specified range in the IMO fuel specification, transmit signals to adjust the position of a valve corresponding to a storage tank including a resid to thereby transport the resid to the blend tank.

26. The system of claim 25, wherein the controller further is in signal communication with the blend tank, and wherein the controller further is configured to cause the blend tank to blend the resid and blend components for a pre-selected time.

27. The system of claim 21, wherein the blend components include one or more of:
one or more slurry oils; and
one or more distillates.

* * * * *